(12) United States Patent
Aekins

(10) Patent No.: US 12,212,379 B2
(45) Date of Patent: Jan. 28, 2025

(54) SYSTEM FOR REDUCING POWER LOSSES IN COMMUNICATIONS CABLING

(71) Applicant: Ortronics, Inc., New London, CT (US)

(72) Inventor: Robert A. Aekins, Quaker Hill, CT (US)

(73) Assignee: Legrand DPC, LLC, West Hartford, CT (US)

( * ) Notice: Subject to any disclaimer, the term of this patent is extended or adjusted under 35 U.S.C. 154(b) by 479 days.

(21) Appl. No.: 17/558,992

(22) Filed: Dec. 22, 2021

(65) Prior Publication Data

US 2023/0198572 A1  Jun. 22, 2023

(51) Int. Cl.
| | |
|---|---|
| H04B 3/44 | (2006.01) |
| G06F 1/18 | (2006.01) |
| G06F 1/26 | (2006.01) |
| H04L 12/10 | (2006.01) |
| H04L 25/02 | (2006.01) |

(52) U.S. Cl.
CPC ............... *H04B 3/44* (2013.01); *H04L 12/10* (2013.01); *G06F 1/189* (2013.01); *G06F 1/26* (2013.01); *G06F 1/266* (2013.01); *H04L 25/02* (2013.01)

(58) Field of Classification Search
CPC . G06F 1/26; G06F 1/266; G06F 1/189; H04L 25/02; H04L 3/44; H04L 12/10
USPC .......................................... 713/300; 710/100
See application file for complete search history.

(56) References Cited

U.S. PATENT DOCUMENTS

| | | | |
|---|---|---|---|
| 7,172,466 B2 | 2/2007 | Aekins et al. | |
| 7,280,032 B2 | 10/2007 | Aekins et al. | |
| 7,485,010 B2 | 2/2009 | Aekins | |
| 7,971,075 B2* | 6/2011 | Diab | H04L 12/10 307/17 |
| 2010/0237846 A1* | 9/2010 | Vetteth | H04L 12/10 323/305 |
| 2011/0241425 A1* | 10/2011 | Hunter, Jr. | H04L 12/10 307/39 |
| 2013/0145181 A1* | 6/2013 | Maniktala | H04L 12/4625 713/300 |
| 2015/0215131 A1* | 7/2015 | Paul | H04L 12/10 713/300 |
| 2017/0149575 A1* | 5/2017 | Chan | H04L 12/10 |
| 2018/0238971 A1* | 8/2018 | Bennett | G01R 31/40 |
| 2022/0214732 A1* | 7/2022 | Dai | G06F 1/26 |
| 2022/0397947 A1* | 12/2022 | Nakamura | G06F 13/382 |

FOREIGN PATENT DOCUMENTS

WO   WO 2006/086622 A2   8/2006

* cited by examiner

*Primary Examiner* — Ji H Bae
(74) *Attorney, Agent, or Firm* — McCarter & English, LLP

(57) ABSTRACT

An example system for reducing power loss in telecommunications cabling is provided. The system includes a power supply, at least one powered device, and a cabling system electrically and communicatively connecting the power supply to the at least one powered device. The cabling system includes a first positive polarity wire pair and a first negative polarity wire pair. The system includes a corrective circuit module connected to the cabling system. The corrective circuit module includes a second positive polarity wire pair, a second negative polarity wire pair, wiring connecting the first positive polarity wire pair with the second positive polarity wire pair, and wiring connecting the first negative polarity wire pair with the second negative polarity wire pair.

16 Claims, 28 Drawing Sheets

| Power / Voltage Requirements and Specifications | | | | |
|---|---|---|---|---|
| Description | 15W<br>IEEE 802.3af<br>PoE | 30W<br>IEEE 802.3at<br>PoE+ | 60W<br>IEEE 802.3.bt PoE<br>(Type 3) | 100W<br>IEEE 802.3.bt PoE<br>(Type 4) |
| Power Supply Voltage Range | 46.0 to 57.0 VDC | 51.0 to 57.0 VDC | 51.0 to 57.0 VDC | 53.0 to 57.0 VDC |
| Voltage Range at PSE Port Output | 44.0 to 56.0 VDC | 50.0 to 56.0 VDC | 50.0 to 56.0 VDC | 52.0 to 56.0 VDC |
| Maximum Power from PoE/P SE Port | 15.4 Watts | 30 Watts | 60 Watts | 100 Watts |
| Minimum Voltage at PoE/PD Port Input* | 37.0 VDC | 42.5 VDC | 42.5 VDC | 41.1 VDC |
| Minimum Power at PoE/PD Port* | 12.95 Watts | 25.5 Watts | 51 Watts | 71 Watts |
| Amperage (A)/Pair | 0.35 | 0.35 | 0.6 | 0.96 |

FIG. 5

SYSTEM FOR REDUCING POWER LOSSES IN COMMUNICATIONS CABLING

BACKGROUND

Traditionally, electrical power and data were transmitted over different wires using different connectors. Power-over-Ethernet (PoE) is a process developed in the telecommunications industry for sending direct current (DC) electrical power and data over twisted pair copper wires. By combining data transmission with power supplying hardware onto the same RJ45 Ethernet connector, transmission of power over the network cabling is permitted.

Typically, the transfer of power is a process where devices (known as power sourcing equipment (PSE)) provide a DC voltage over a standard 4-pair Ethernet cable to another connected device (known as a powered device (PD)). This allows for the powering of the powered device without the need for a local power connection source at the device location or having to run a separate cable for power. The amount of DC power that is transmitted is generally defined by the IEEE 802.3af, 802.3at and 802.3bt standards. Two wire pairs are generally used for low power transmissions (less than 30 W), and four wire pairs are generally used for higher power transmissions (up to 100 W).

The capacity to deliver power over unshielded twisted pair (UTP) cabling is generally limited (in the milliamp ranges), and the primary considerations are typically knowing what the application electrical load, the loads aggregate on the system, and if the system is capable of delivering that degree of required power. As DC power is transferred on a traditional UTP cable, an associated amount of power loss occurs due to its material design that produces energy loss resistance. As the input power or input amperage is increased, the cabling losses also increase, resulting in less power received at the transmission end powered device. Such losses can occur in cabling lengths of both less than and greater than 100 m. Although the powered device will generally work in most cases, the amount of power loss can be significant and is hidden, as it is typically taken out from the power sourcing equipment (PSE) power budget if it is available.

For Ethernet network systems, 10BASE-T, 100BASE-TX, and 1GBASE-T transmission is typically over 4-pair unshielded twisted pair (UTP) cabling. Of such 4-pair cabling, only two pairs are typically used for data transmission and two pairs are used for power (if it is an IEEE PoE 802.3at or a PoE 802.3af system). If the system is 10BASE-T or 100BASE-TX, then two pairs are used for data; and if the system is 1GBASE-T or higher, then all four pair are typically used for data transmission. If the system is an IEEE 802.3bt PoE system, then all four pairs are used for power transmission. In general, there are two ways PoE networks can be used to source DC power—by adding a PoE injector (e.g., a midspan device), or by using a PoE enabled network switch at the switch side (e.g., an endspan device)—to transfer power on an existing data line to the powered device.

FIG. 1 is diagrammatic view of a traditional two pair twisted Power-over-Ethernet cabling system 10 including power source equipment and a powered device. The system 10 includes a DC supply circuit 12 and a horizontal cabling circuit 14 electrically and communicatively connecting the DC supply circuit 12 to a DC load circuit 16. The DC supply circuit 12 includes a power supply 18, a first wire pair 20, and a second wire pair 22. Both wire pairs 20, 22 extend through the horizontal cabling circuit 14, with the wire pair 20 having a positive resistance (R2) and the wire pair 22 having a negative resistance (R3). The wire pairs 20, 22 connect to a powered device 24 of the DC load circuit 16.

If the power supply 18 is 56 VDC with 0.5 A of current, the positive wire pair 20 resistance R2 is 12 Ohms, and the negative wire pair 22 resistance R3 is 12 Ohms, then by Ohm's law ($P=I^2*R$) the power loss is 3 W for the first wire pair 20 and 3 W for the second wire pair 22, giving a total of 6 W cable power loss. In other words, the cable is giving off 6 W of heat due to the cable's resistance, with current being the primary enemy of power delivery.

In operation, a midspan device could be electrically connected to an Ethernet switch (e.g., the DC supply circuit 12) by a data only cable, and the midspan device would further be communicatively and electrically connected to the powered device 24 by a data and DC power cable. The midspan device is typically powered by an AC power source (e.g., an electrical wall outlet), and converts that AC power to DC power using the IEEE 802.3 PoE protocols for proper power recognition and levels. The PoE midspan device can therefore be used to add power to the cabling system 10 midway between the Ethernet switch and the powered device 24. Use of the midspan device generally necessitates location and data cabling management of tracking an extra device for the system, a nearby power outlet to provide power to the midspan device, structured cabling (e.g., with midspan devices generally accepting RJ45 plugs instead of direct UTP cables), and may affect data performance of the system (e.g., cabling performance may be degraded if the cabling category rating is not maintained by the midspan device interface ports).

FIG. 2 is a diagrammatic view of a traditional two pair cabling system 30 with one type of PoE arrangement of the wire pairs (e.g., an IEEE Type 1 system). In particular, the system 30 includes power source equipment (PSE) 32 electrically and communicatively connected to a powered device (PD) 34 via a horizontal cabling circuit 36. The circuit 36 includes a first wire pair 38, a second wire pair 40, a third wire pair 42, and a fourth wire pair 44. The positive polarity is on the second wire pair 40 and the negative polarity is on the third wire pair 42. Thus, only two wire pairs of the four wire pairs are used for transmitting power.

FIG. 3 is a diagrammatic view of a traditional two pair cabling system 50 with another type of PoE arrangement of the wire pairs (e.g., an IEEE Mode B system). The system 50 can be substantially similar to the system 30, except for the distinctions noted herein. In particular, the system 50 also includes the PSE 32 electrically and communicatively connected to the PD 34 via the horizontal cabling circuit 36. However, in the arrangement of FIG. 3, the positive polarity is on the first wire pair 38 and the negative polarity is on the fourth wire pair 44. Thus, only two wire pairs of the four wire pairs are used for transmitting power.

FIG. 4 is a diagrammatic view of a traditional four pair cabling system 60 with one type of PoE arrangement of the wire pairs (e.g., an IEEE Type 4 system). The system 60 can be substantially similar to the systems 30, 50, except for the distinctions noted herein. In particular, the system 60 also includes the PSE 32 electrically and communicatively connected to the PD 34 via the horizontal cabling circuit 36. However, in the arrangement of FIG. 4, the positive polarity is on the first and second wire pairs 38, 40, and the negative polarity is on the third and fourth wire pairs 42, 44. Thus, all wire pairs are used by the system 60 for power transmission, leaving no spare wire pairs for additional power transmission.

The traditional Power-over-Ethernet systems discussed herein could be arranged to include an endspan device (e.g., a power source equipment (PSE) device). The endspan device is typically an Ethernet protocol network switch device that has PoE capabilities built in which combines data signals and DC power onto the transfer cables for transmission to the powered device(s). For example, the system can include an endspan device built into the PoE Ethernet switch, which can be electrically connected to an AC power outlet. The switch can be communicatively and electrically connected to the powered device(s) via the data and DC power cables.

Using either midspan or endspan devices for transfer of DC power on UTP cabling produces predicted power loss due to the cabling resistivity properties. In both cases, the DC power for an IEEE 802.3af or 802.3at system is placed on two pairs out of the four pairs in a standard Telecommunication Industry Association (TIA) defined TIA 568 series 4-pair cabling. In most cases, the power losses appear hidden to the end user since the powered device will still function if it receives its requested power.

FIG. 5 provides a chart of the allowed power losses and voltage requirements for PoE from the IEEE 802.3 standard for maximum cabling lengths of 100 m. The 15 W column represents a Type 1 voltage requirements, the 30 W column represents a Type 2 voltage requirement, the 60 W column represents a Type 3 voltage requirement, and the 100 W column represents a Type 4 voltage requirement. If the endspan or midspan devices are expected to supply 100 W (Type 4) power and the minimum cabling power loss allowed is 71 W, there is a direct cabling allowed loss of 29 Watts per port. The power loses are less dramatic (although still problematic) when using a 15 W endspan device as the minimum loss is 12.95 W per port (due to cabling loss of 2.05 W). For example, if using a 15 W endspan device for 1,000 powered devices at an average maximum distance, there is a potential for over 2,050 W per hour loss (a 24-hour time period loss of 49,200 W per day). The power loss and data center Power Usage Effectiveness (PUE) over time (which provides a ratio to describe how efficiently a computer data center uses energy) can grow significantly as time is compounded, and the allowed power losses are higher as the input power is increased from 15 W to 100 W in endspan device systems.

Additional options exist for extending data beyond 100 m. For example, adding PoE extenders (or repeaters) in the horizontal cabling. Such extenders or repeaters typically drain about 5 W of power each for the active signal regeneration, and the extension is for data only. As a further example, a switch with an extended data signal option may be used to enhance the power levels as well as the data signals. However, both options necessitate active components for operation.

Therefore, as PoE gains in market acceptance, more and more devices necessitate improved power delivery for expected performance. Improved energy savings thresholds have also been established in the industry by various organizations and environmental groups.

SUMMARY

Embodiments of the present disclosure provide an exemplary system for reducing power losses in a telecommunications cabling system and/or circuit. The system provides a cost-effective way to improve the power efficiency of cabling used for PoE network transmissions by use of replaceable and modified connectivity that can be installed within the network cabling system for channel or permanent link transmission configurations. The system includes corrective circuits that effectively double the twisted wire pairs, increasing the pathways for power and/or data to be transmitted, thereby reducing the overall resistance of the cabling system. The system can aid in power delivery to improve the cabling resistance capacities which, in turn, decreases the thermal footprint and reduces the cable power losses.

In accordance with embodiments of the present disclosure, an exemplary system for reducing power losses in telecommunications cabling is provided. The system includes a power supply, at least one powered device, and a cabling system electrically and communicatively connecting the power supply to the at least one powered device. The cabling system includes a first positive polarity wire pair and a first negative polarity wire pair. The system includes a corrective circuit module connected to the cabling system. The corrective circuit module includes a second positive polarity wire pair, a second negative polarity wire pair, wiring connecting the first positive polarity wire pair with the second positive polarity wire pair, and wiring connecting the first negative polarity wire pair with the second negative polarity wire pair.

In some embodiments, the power supply can be a power sourcing equipment providing a direct current (DC) to the cabling system. In some embodiments, the power supply can be a Power-over-Ethernet switch. The cabling system can be an Ethernet twisted pair cabling system. The cabling system can be a horizontal cable circuit. In some embodiments, the at least one powered device can be, e.g., a camera, a light, or the like.

The corrective circuit module includes a first correction circuit including the wiring connecting the first positive polarity wire pair with the second positive polarity wire pair. The wiring splits power signals for transmission along both the first and second positive polarity wire pairs. The first correction circuit splits the power signals at a proximal end of the cabling system for transmission of the power signals along both the first and second positive polarity wire pairs to a distal end of the cabling system. The first correction circuit blocks data signals from transmission along the second positive polarity wire pair. The corrective circuit module includes a second correction circuit with wiring merging the second positive polarity wire pair with the first positive polarity wire pair at the distal end of the cabling system to transmit the power signals to the at least one powered device only along the first positive polarity wire pair. The data signals continue to be transmitted along the first positive polarity wire pair.

The corrective circuit module includes a second correction circuit including the wiring connecting the first negative polarity wire pair with the second negative polarity wire pair. The wiring splits power signals for transmission along both the first and second negative polarity wire pairs. The second correction circuit splits the power signals at a distal end of the cabling system for transmission of the power signals along both the first and second negative polarity wire pairs to a proximal end of the cabling system. The second correction circuit blocks transmission of data signals along the second negative polarity wire pair. The corrective circuit module includes a first correction circuit with wiring merging the second negative polarity wire pair with the first negative polarity wire pair at the proximal end of the cabling system to transmit the power signals to the power supply only along the first negative polarity wire pair. The data signals continue to be transmitted along the first negative polarity wire pair.

In accordance with embodiments of the present disclosure, an exemplary power loss reduction device for a cabling system is provided. The cabling system includes a first positive polarity wire pair and a second positive polarity wire pair. The power loss reduction device includes a first correction circuit configured to be electrically and communicatively connected to a proximal end of the cabling system. The first correction circuit includes a second positive polarity wire pair and wiring connecting the first positive polarity wire pair with the second positive polarity wire pair. The power loss reduction device includes a second correction circuit configured to be electrically and communicatively connected to a distal end of the cabling system. The second correction circuit includes a second negative polarity wire pair and wiring connecting the first negative polarity wire pair with the second negative polarity wire pair.

The wiring of the first correction circuit splits power signals at the proximal end of the cabling system for transmission of the power signals along both the first and second positive polarity wire pairs to the distal end of the cabling system. The first correction circuit blocks data signals from transmission along the second positive polarity wire pair. The second correction circuit includes wiring merging the second positive polarity wire pair with the first positive polarity wire pair at the distal end of the cabling system to transmit the power signals to at least one powered device only along the first positive polarity wire pair.

The wiring of the second correction circuit splits power signals at the distal end of the cabling system for transmission of the power signals along both the first and second negative polarity wire pairs to the proximal end of the cabling system. The second correction circuit blocks transmission of data signals along the second negative polarity wire pairs. The first correction circuit includes wiring merging the second negative polarity wire pair with the first negative polarity wire pair at the proximal end of the cabling system to transmit the power signals to a power supply only along the first negative polarity wire pair.

In accordance with embodiments of the present disclosure, an exemplary method of reducing power loss in telecommunications cabling is provided. The method includes providing power from a power supply to a cabling system. The cabling system includes a first positive polarity wire pair and a first negative polarity wire pair. The method includes electrically and communicatively connecting the power supply to at least one powered device with the cabling system. The method includes connecting a corrective circuit module to the cabling system. The corrective circuit module includes a second positive polarity wire pair, a second negative polarity wire pair, wiring connecting the first positive polarity wire pair with the second positive polarity wire pair, and wiring connecting the first negative polarity wire pair with the second negative polarity wire pair.

The method includes splitting power signals at a proximal end of the cabling system with the wiring of the corrective circuit module connecting the first positive polarity wire pair with the second positive polarity wire pair for transmission of the power signals along both the first and second positive polarity wire pairs to a distal end of the cabling system. The method includes blocking transmission of data signals along the second positive polarity wire pair. The method includes merging the second positive polarity wire pair with the first positive polarity wire pair at the distal end of the cabling system to transmit the power signals to the at least one powered device only along the first positive polarity wire pair.

The method includes splitting power signals at a distal end of the cabling system with the wiring of the corrective circuit module connecting the first negative polarity wire pair with the second negative polarity wire pair for transmission of the power signals along both the first and second negative polarity wire pairs to a proximal end of the cabling system. The method includes blocking transmission of data signals along the second negative polarity wire pair. The method includes merging the second negative polarity wire pair with the first negative polarity wire pair at the proximal end of the cabling system to transmit the power signals to the power source only along the first negative polarity wire pair.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the system for reducing power losses in telecommunications cabling, reference is made to the accompanying figures, wherein:

FIG. 5 is a chart of power and voltage requirements and specifications based on IEEE standards for a maximum cable length of 100 meters;

DETAILED DESCRIPTION

Figure 1:
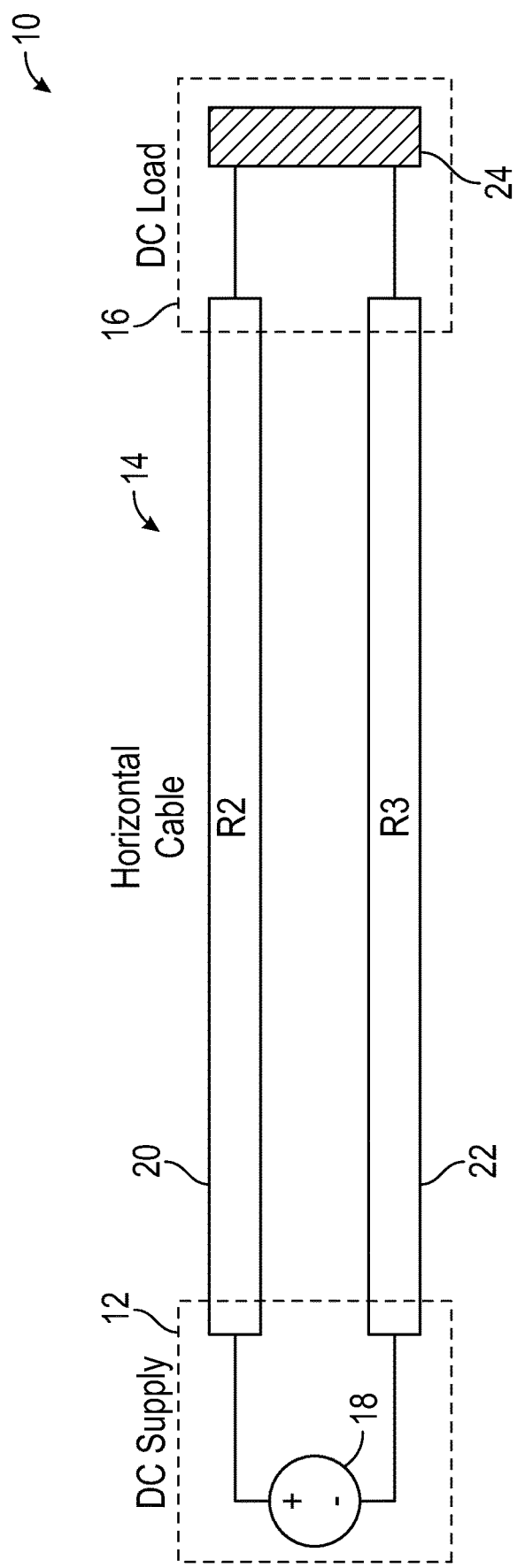
FIG. 1 is diagrammatic view of a traditional two pair twisted Power-over-Ethernet cabling system.

According to the IEEE 802.3 Ethernet 10BASE-T and 100BASE-TX system industry standards, only two cable pairs for data transmission are needed. According to the IEEE 802.3af/at system industry standards, only two cable pairs are needed for DC power transmission. The TIA and IEEE also include established industry standards for length requirements for UTP Ethernet data and power transmissions that have a maximum of 100 m (about 328 ft). Operating in these standards and beyond, cabling maximum lengths produce significant power losses for IEEE 802.3 PoE systems which is mainly due to the size and resistance of the current carrying cabling wires (e.g., also known as horizontal cabling).

The exemplary system improves cabling power delivery by effectively increasing the cabling electrical transfer wire size which, in turn, reduces the cable's transmitting cabling resistance. This is achieved by using only passive components. The transfer current is reduced by splitting the power onto spare cable pairs without disruption of their data signal, which has the same effect as increasing the wire gauge size. Using the exemplary system or module (as compared to traditional cabling adapters) in effect provides long term, year-over-year (YOY) cost savings to the end user. Such cost savings may have an estimated return on investment (ROI) of under one year, depending on the required power usages. The exemplary system therefore provides for improved power efficiency that allows extending the length of cabling, while maintaining the minimum IEEE 802.3af through 802.3bt received power input to the power device(s). Such systems can be used in a variety of telecommunications settings, e.g., low data PoE devices (such as low power lighting, internet of things (IoT), industrial internet of things (IIoT), or the like), and higher power devices (such as pan-tilt-zoom (PTZ) cameras, monitors, high-power lighting, or the like).

The exemplary system includes a connector device that includes a signal compensation module that compensates for transmitted signals combined with targeted frequency blocking filtering. This results in power lines of the data pairs being divided onto the spare unused pairs for DC transmission. The original power that was transmitting on two pairs is therefore shared on four pairs (e.g., two pairs positive and two pairs negative). As such, the system essentially doubles the cross-sectional area size of the conducting material which, in turn, reduces the electrical resistance and reduces the pairs wire power losses. By reducing the current carrying capacity's resistivity per cabling pairs, the system directly improves the Power Sourcing Equipment power efficiency delivery which in effect supplies more power to the end connected power device(s).

The line sharing of power provided by the system uses a Quad Synchronize Power Diversion (QSPD) method. QSPD is the Quad equally and Synchronized Polarity Diversion of Direct Current (DC) power of a PoE source equipment from dual (two wires) to four wires for quad transmission on twisted pair cabling systems. By quadrupling the cable transmission wires, the new effective gauges become, e.g., 24 AWG becomes equivalent to 18 AWG, 22 AWG becomes equivalent to 16 AWG, and the like.

Figure 6:
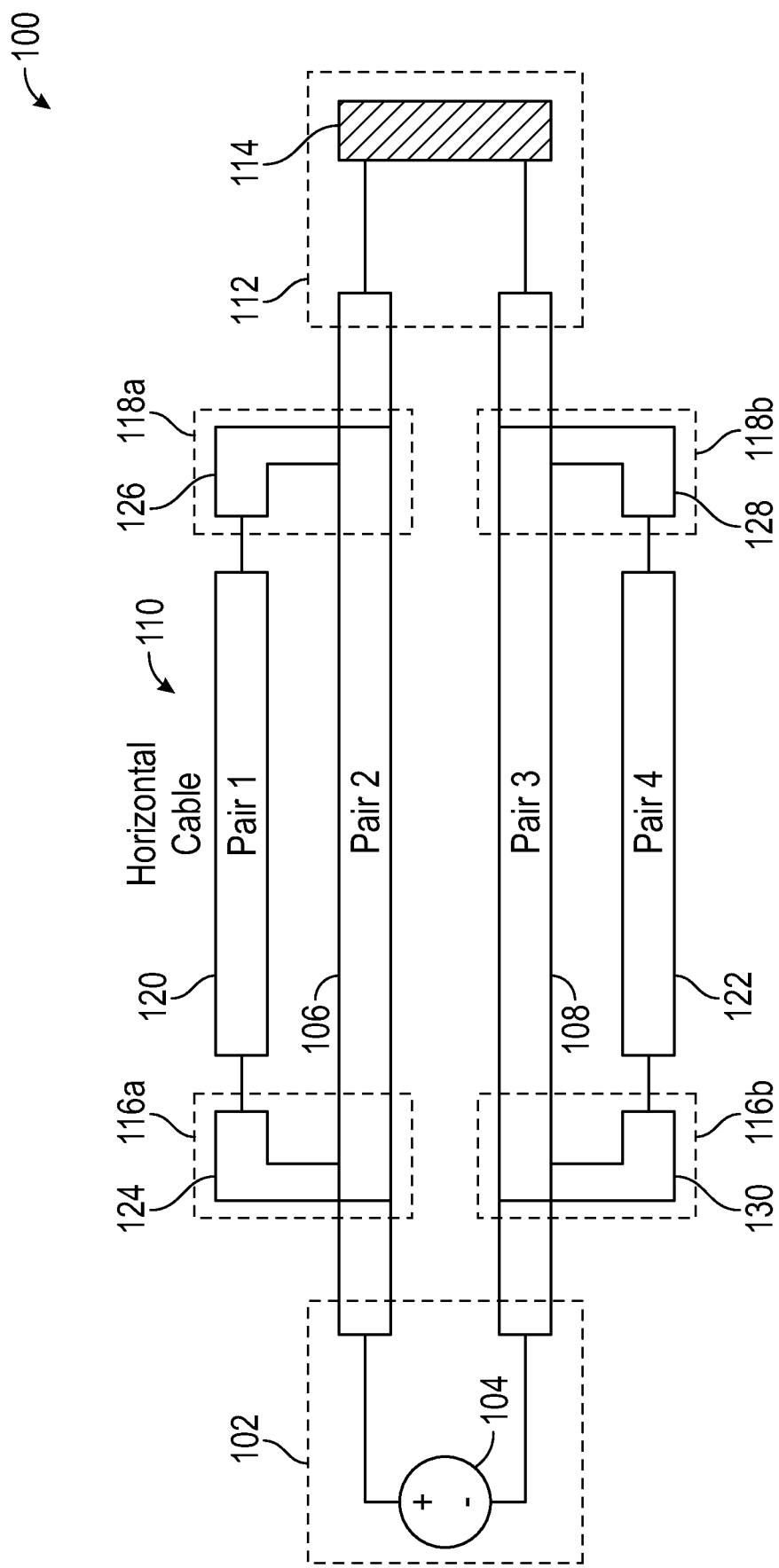
FIG. 6 is a diagrammatic view of a splitting circuitry for a two pair twisted cabling system including a system for power loss reduction in an exemplary embodiment.

FIG. 6 is a diagrammatic view of splitting circuitry for an exemplary system 100 for power loss reduction incorporated into a two pair twisted cabling system. The system 100 includes a DC supply circuit 102 including a power supply 104, a first wire pair 106 (e.g., a positive wire pair) connected to the power supply 104, and a second wire pair 108 (e.g., a negative power pair) connected to the power supply 104. The system 100 includes a horizontal cable circuit 110 disposed between the DC supply circuit 102 and a DC load circuit 112 having powered device(s) 114. The system 100 includes a first positive correction circuit 116a associated with the first wire pair 106, and a first negative correction circuit 116b associated with the second wire pair 108. The first positive and negative correction circuits 116a are disposed between and electrically connected to the DC supply circuit 102 and the horizontal cable circuit 110. The system 100 includes a second positive correction circuit 118a associated with the first wire pair 106, and a second negative correction circuit 118b associated with the second wire pair 108. The second positive and negative correction circuits 118a, 118b are disposed between and electrically connected to DC load circuit 112. Although shown as separate circuits, in some embodiments, the first positive and negative correction circuits 116a, 116b can be formed as a single or joint correction circuit. Similarly, in some embodiments, the second positive and negative correction circuits 118a, 118b can be formed as a single or joint correction circuit.

As illustrated in FIG. 6, the system 100 includes the traditional first and second wire pairs 106, 108 extending between the DC supply circuit 102 and the DC load circuit 112, one wire pair for each respective polarity. The system 100 further includes a third wire pair 120 for the positive polarity and a fourth wire pair 122 for the negative polarity. The correction circuit 116a receives as input the first wire pair 106 (e.g., at a proximal end of the horizontal cable circuit 110), and includes wiring 124 which splits the first wire pair 106 to redirect a portion of the power (e.g., about 50%) into the third wire pair 120, effectively creating two wire pairs for the positive polarity side of the system 100. Thus, the correction circuit 116a allows for any power traditionally transmitted only on the first wire pair 106 to be split onto the "spare" third wire pair 120 without disruption of the data signal being transmitted along the first wire pair 106. The wiring 124 transfers the positive polarity power to the third wire pair 120. The power is split equally or substantially equally (about 50/50) between the wire pairs 106, 120 during the positive polarity power transmission. The data signals can be electronically filtered out by wide band common mode chokes to maintain the data signal transmission along only the wire pair 106 (i.e., not along wire pair 120).

Use of the "spare" third wire pair 120 in combination with the first wire pair 106 provides a similar effect as increasing the wire gauge size of the first wire pair 106. The second positive correction circuit 218a (e.g., located at the distal end of the horizontal cable circuit 110) receives as input both the first and third wire pairs 106, 120, and includes wiring 126 for merging the third wire pair 120 into the first wire pair 106. The result is therefore a single wire pair (e.g., the first wire pair 106) connected to the DC supply circuit 102 and the DC load circuit 112, with two wire pairs (e.g., the first and third wire pairs 106, 120) extending along the horizontal cable circuit 110.

On the negative polarity side, the second wire pair 108 extends as output from the DC load circuit 112, and the second negative correction circuit 218b includes wiring 128 which splits the second wire pair 108 to redirect a portion of the power into the fourth wire pair 122 (e.g., about 50%), effectively creating two wire pairs for the negative polarity side of the system 100. Thus, the correction circuit 218a allows for any power traditionally transmitted only on the second wire pair 108 to be split onto the "spare" fourth wire pair 122 without disruption of the data signal being transmitted along the second wire pair 108. The wiring 128 therefore transfer the negative polarity power to the fourth wire pair 122. The power is split equally or substantially equally (about 50/50) between the wire pairs 208, 222 during the negative power transmission. The data signals can be electronically filtered out by wide band common mode chokes to maintain the data signal transmission along only the wire pair 208 (i.e., not along wire pair 222).

Use of the "spare" fourth wire pair 122 in combination with the second wire pair 108 provides a similar effect as increasing the wire gauge size of the second wire pair 108. The first negative correction circuit 216b receives as input both the second and fourth wire pairs 108, 122, and includes wiring 130 for merging the fourth wire pair 122 into the second wire pair 108. The result is therefore a single wire pair (e.g., the second wire pair 108) connected to the DC supply circuit 102 and the DC load circuit 112, with two wires (e.g., the second and fourth wire pairs 108, 122) extending along the horizontal cable circuit 110.

The system 200 therefore improves the cabling current capacity of the traditional two pair twisted cabling system. The current that was previously carried on two wires per polarity is now synchronized and equally (or substantially equally) carried on four wires (quad) per polarity due to incorporation of the correction circuits 116, 118. As an example (and using the same values discussed above with respect to traditional cabling systems), if the power supply is 56 VDC with 0.5 A of current, the positive first wire pair 106 resistance R1 and the positive third wire pair 120 resistance R2 is divided to 6 Ohms each. Similarly, the negative second wire pair 108 resistance R2 and the negative fourth wire pair 122 resistance R4 is divided to 6 Ohms each. By Ohm's law, the power loss is calculated to be 1.5 W for the first wire pair 106 and 1.5 W for the third wire pair 120, which results in a total of 3 W cable power loss (i.e., half of the power loss of a traditional two wire twisted pair cabling system). The cable therefore gives off only 3 Watts of heat because of the reduced wire resistance for current power delivery, which also reduces the cable's thermal footprint due to the direct relationship of the thermal footprint to the lowered power losses.

In some embodiments, the system 100 (referred to herein as xLP for xLow Power and xHP for xHigh Power) can include pair noise reducing signal compensation, as described in U.S. Pat. Nos. 7,485,010 and 7,172,466, which are incorporated herein by reference in their entirety. In some embodiments, the system 100 can include line signal blocking circuitry, as described in U.S. Pat. No. 7,280,032, which is incorporated herein by reference in its entirety. The pair noise reducing signal compensation and/or line signal blocking circuitry allows the power to be split from two to four wires without degrading the frequency base-band of the originating Ethernet switch data signal. A direct open line of an electrical connection can be used to split the signals, power and data, and the splitting of data signals may produce unwanted signal reflections, as well as increase signal insertion losses. The pair noise reducing signal compensation maintains the data signal integrity to meet the Telecommunication Industry Association TIA568.2-D category 5-6 levels for the required data speed transmissions. Such compensation prevents errors from occurring for the transmission of the data signals.

Figure 3:
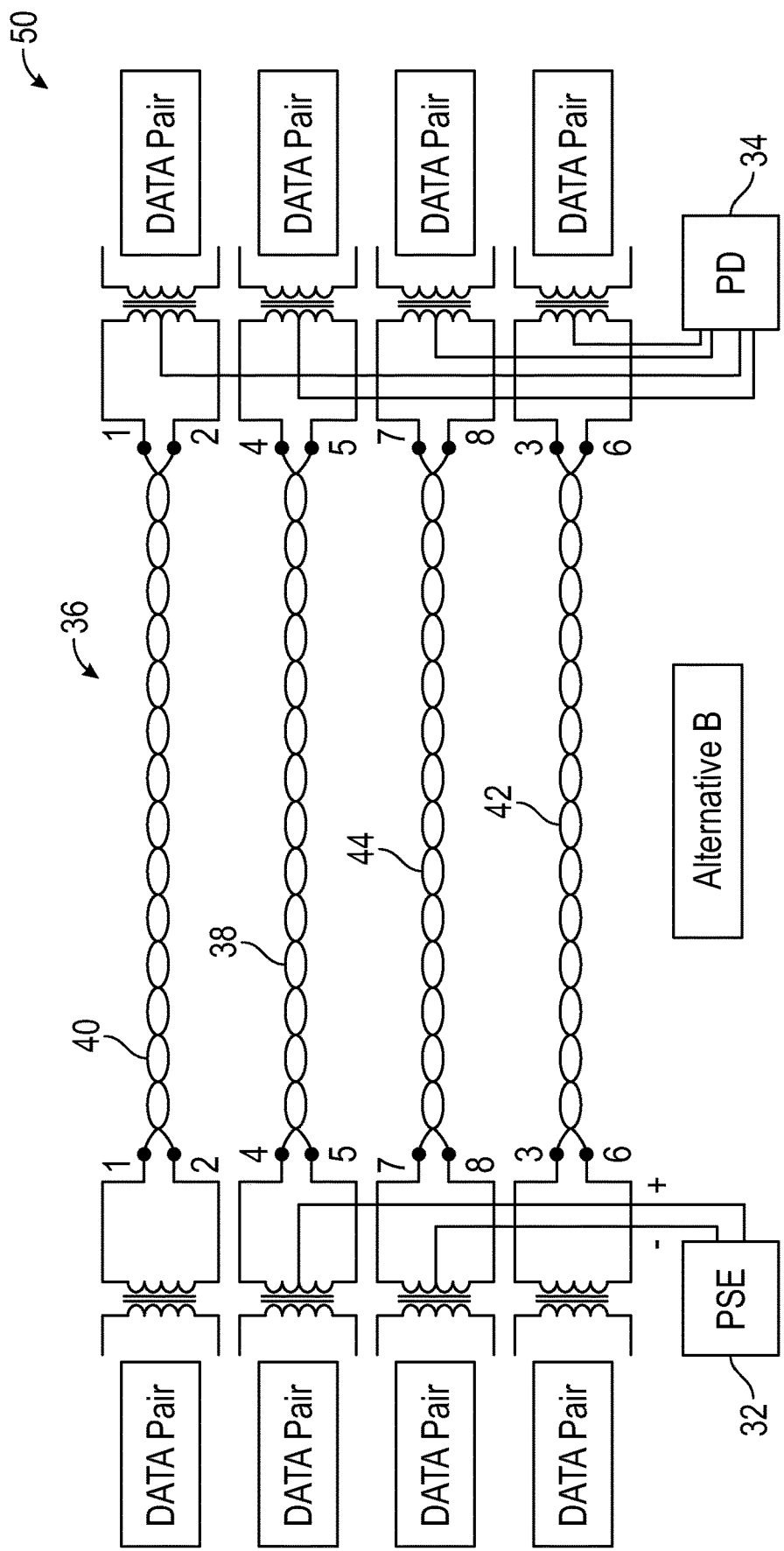
FIG. 3 is a diagrammatic view of a traditional two pair cabling system arrangement with positive and negative polarity on respective wire pairs.
Figure 7:
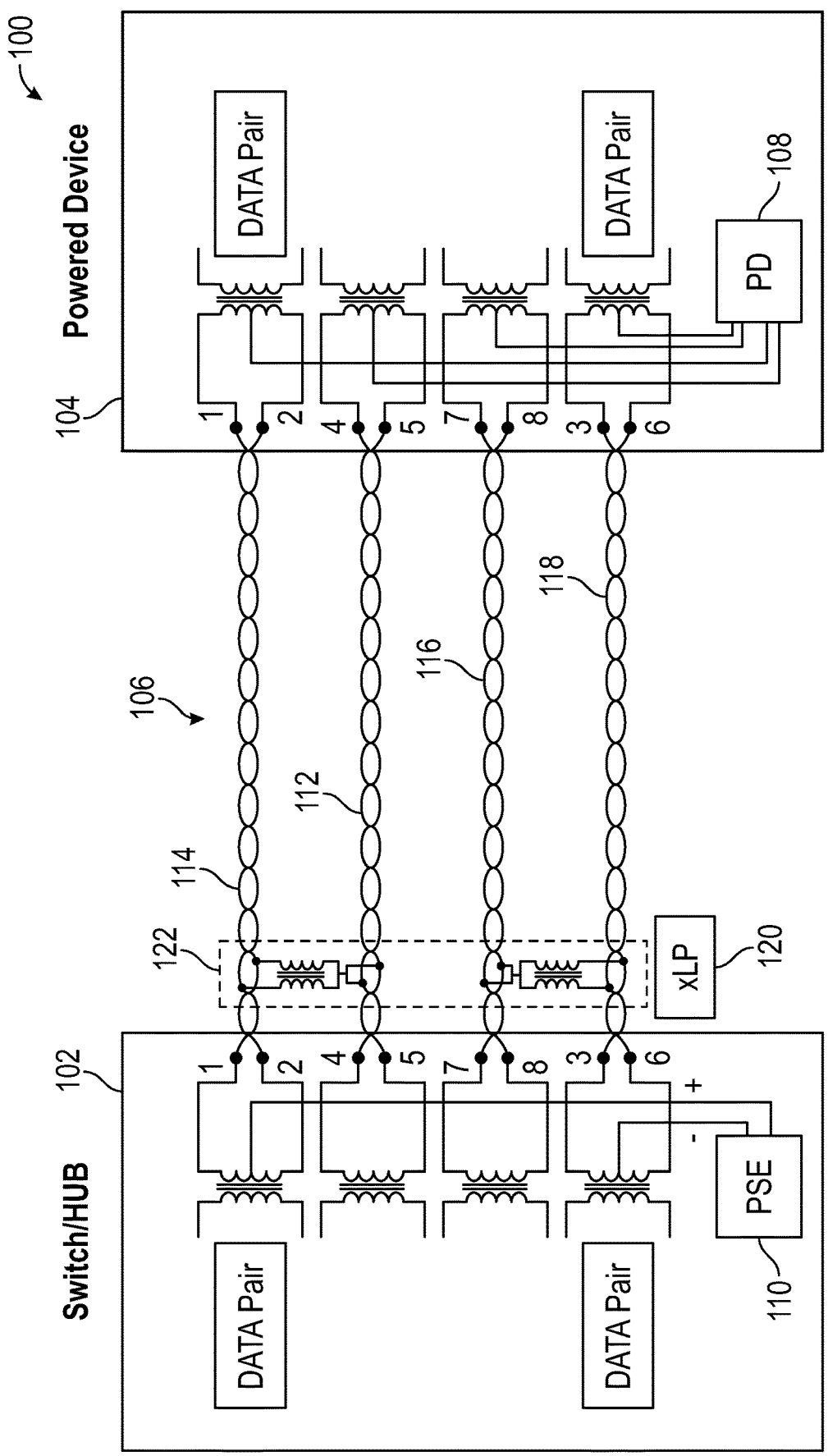
FIG. 7 is a diagrammatic view of a system for power loss reduction incorporated into a two pair cabling arrangement of FIG. 3 in an exemplary embodiment.

FIG. 7 is a diagrammatic view of a system 100 for power loss reduction incorporated into a two pair cabling arrangement (e.g., the cabling arrangement of FIG. 3). The system 100 includes an Ethernet switch or hub 102 (including power source equipment 110) and a powered device circuit 104 (including a powered device 108) electrically and communicatively connected to each other by a horizontal cable circuit 106. The horizontal cable circuit 106 includes a first positive wire pair 112 (e.g., a first wire pair), a second positive wire pair 114 (e.g., a second wire pair), a first negative wire pair 116 (e.g., a third wire pair), and a second negative wire pair 118 (e.g., a fourth wire pair). The system 100 includes a power loss reduction device 120 (e.g., xLP) incorporated therein, the device 120 including correction circuitry 122.

The correction circuitry 122 splits the positive polarity power transmission between the first and second positive wire pairs 112, 114, and similarly splits the negative polarity power transmission between the first and second negative wire pairs 112, 114. The powered device 108 internally merges the positive polarity power transmission signals into the first positive wire pair 112. The correction circuitry 122 merges the negative polarity power transmission signals into the first negative wire pair 116 prior to entering the switch or hub 102.

Figure 4:
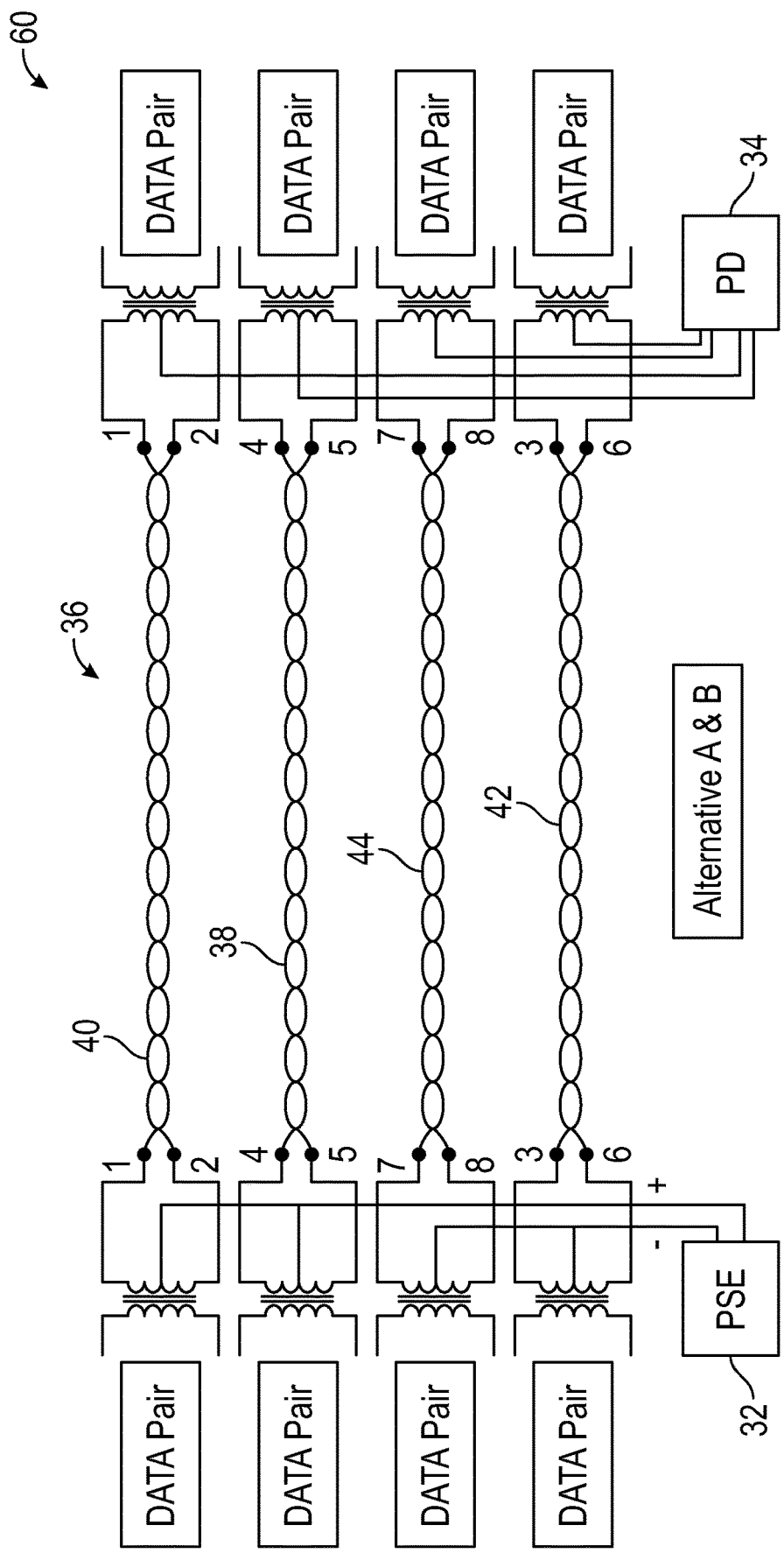
FIG. 4 is a diagrammatic view of a traditional four pair cabling system arrangement with positive and negative polarity on respective wire pairs.
Figure 8:
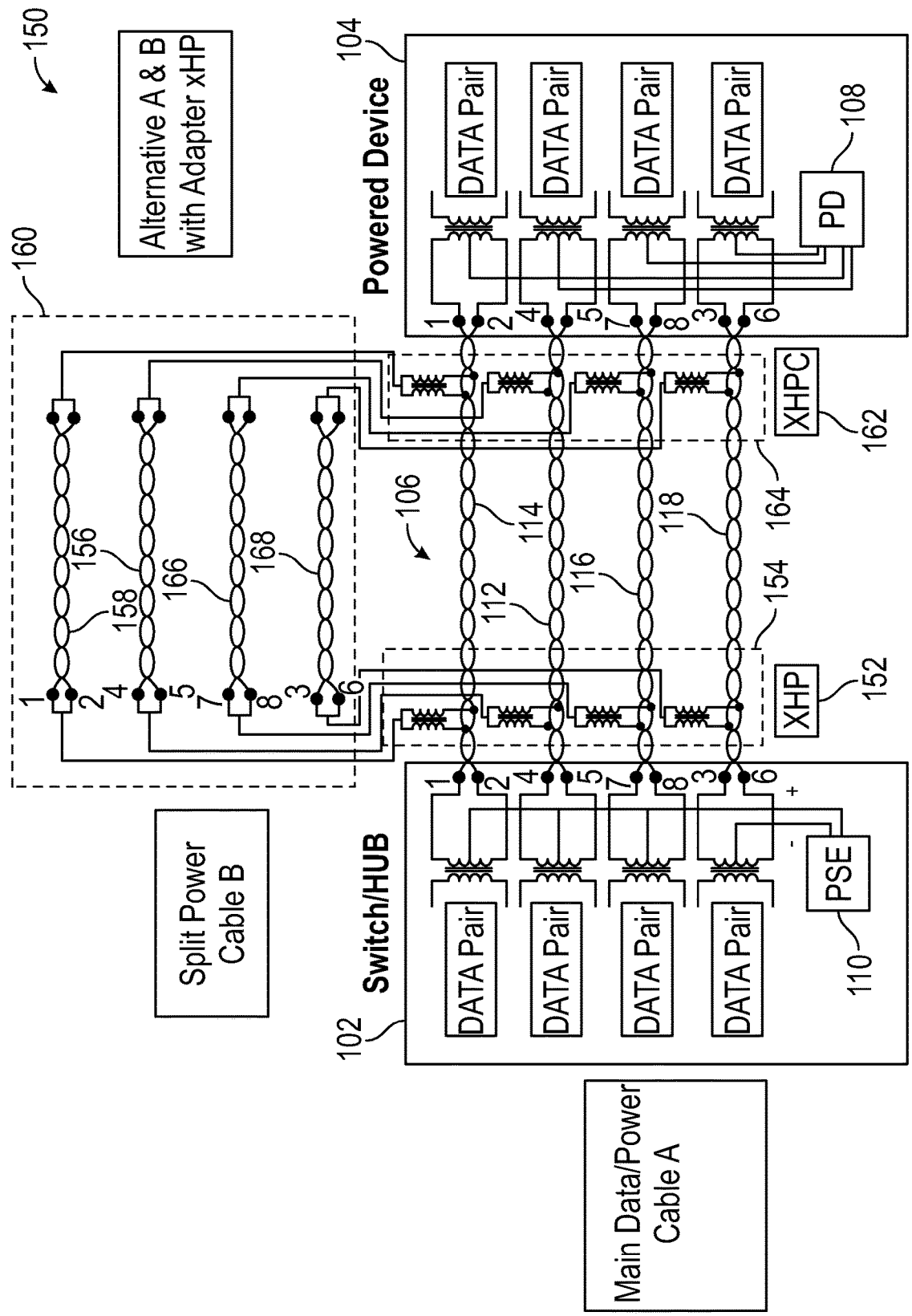
FIG. 8 is a diagrammatic view of a system for power loss reduction incorporated into a four pair cabling arrangement of FIG. 4 in an exemplary embodiment.

FIG. 8 is a diagrammatic view of a system 150 for power loss reduction incorporated into a four pair cabling arrangement (e.g., the cabling arrangement of FIG. 4). For clarity, same reference numbers are used to same structures throughout the diagrams. Similar to the system 100 of FIG. 7, the system 150 of FIG. 8 includes the Ethernet switch or hub 102 (including the power source equipment 110) connected to the powered device circuit 104 (including the powered device 108) by a horizontal cable circuit 106. The horizontal cable circuit 106 includes the first and second positive wire pairs 112, 114, and the first and second negative wire pairs 116, 118.

The system 150 includes a power loss reduction device 152 incorporated therein (e.g., a high power reduction device xHP) including correction circuitry 154. The correction circuitry 154 can be used to split each of the first and second positive polarity wire pairs 112, 114 into their respective secondary positive polarity wire pairs 156, 158, which are part of a secondary wire pair circuit 160. The system 150 includes another power loss reduction device 162 incorporated therein (e.g., a high power reduction device xHPC) including correction circuitry 164. The correction circuitry 164 can be used to combine the power transmitted along the first positive polarity wire pair 112 and the secondary positive polarity wire pair 156 into only the first positive polarity wire pair 112, and similarly combine the power transmitted along the second positive polarity wire pair 114 and the secondary positive polarity wire pair 158 into only the second positive polarity wire pair 114, prior to entering the powered device circuit 104.

The correction circuitry 162 can perform a similar splitting for the negative polarity power signals (e.g., splitting the power signal from the first negative polarity wire pair 116 into the first negative polarity wire pair 116 and a secondary negative polarity wire pair 166, and splitting the power signal from the second negative polarity wire pair 118 into the second negative polarity wire pair 118 and a secondary negative polarity wire pair 168). The correction circuitry 154 can combine the signals into their respective first and second negative polarity wire pairs 116, 118 prior to entering the switch or hub 102. Thus, rather than four wire pairs for transmission of the power signal, eight wire pairs can be used. The data signals remain on the "original" wire pairs 112-118.

Figure 9:
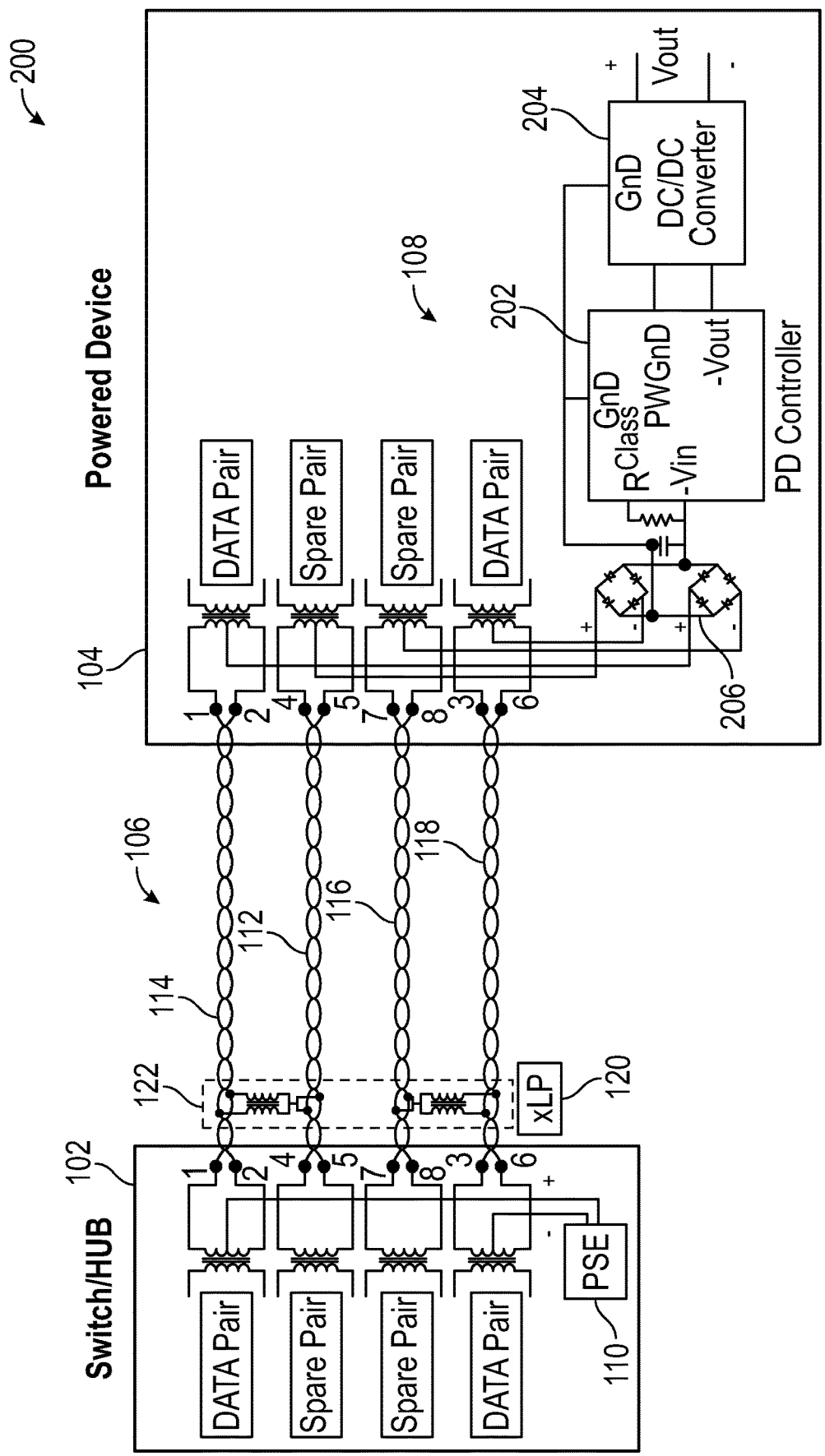
FIG. 9 is a diagrammatic view of a system for power loss reduction incorporated into a two pair cabling arrangement of FIG. 2 in an exemplary embodiment.

FIG. 9 is a diagrammatic view of a system 200 for power loss reduction incorporated into a two pair cabling arrangement. For clarity, same reference numbers are used to same structures throughout the diagrams. Similar to the system 100 of FIG. 7, the system 200 of FIG. 9 includes the Ethernet switch or hub 102 (including the power source equipment 110) connected to the powered device circuit 104 (including the powered device 108) by a horizontal cable circuit 106. The horizontal cable circuit 106 includes the first and second positive wire pairs 112, 114, and the first and second negative wire pairs 116, 118. The second positive wire pair 114 and the second negative wire pair 118 act as "spare" wire pairs. The system 200 includes the power loss reduction device 120 (e.g., xLP) and associated correction circuitry 122 incorporated therein to split the power transmission along spare wire pairs 114, 118, respectively.

The powered device 108 can include a PD controller 202 electrically and communicatively connected to a DC/DC converter 204, and two switches 206. FIG. 9 illustrates that when inserting the exemplary xLP device into the system 200, the power is split on the primary and secondary wire pairs 112, 116. The PD circuitry 104 shows the capability of the electrical connections to recombine the previously split power signal from the xLP device. The power signal enters the PD 108 at the interfacing pair transformers, which are electrically connected to rectifying bridge diodes that combine the power positive and negative polarities to their originating levels.

Figure 2:
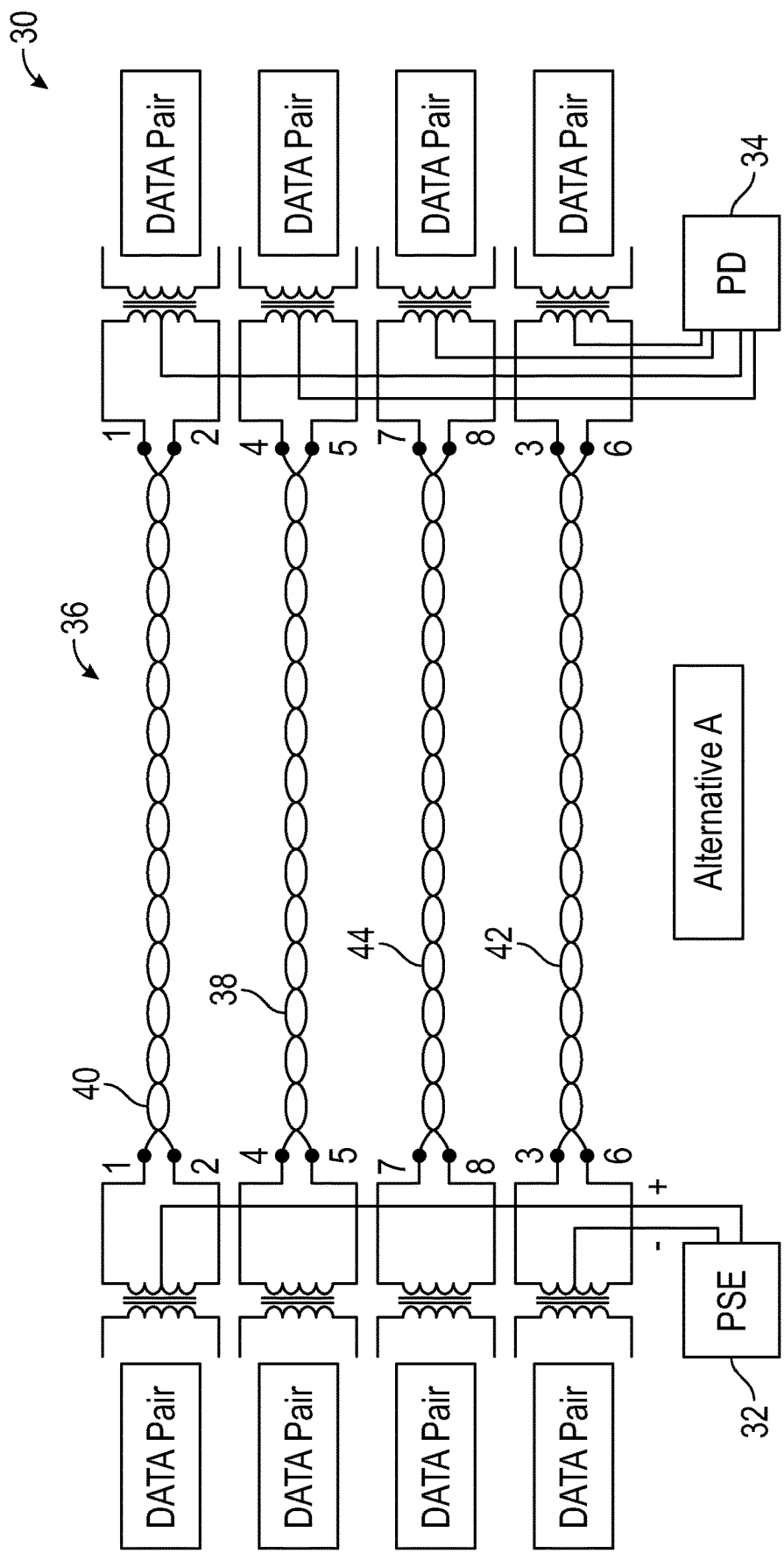
FIG. 2 is a diagrammatic view of a traditional two pair cabling system arrangement with positive polarity and negative polarity on respective wire pairs.

The xLP system 120 is designed for four pair cabling systems 200 that utilize two wire pairs for data transmission and two wire pairs for power transfer, such as 10BASE-T and 100BASE-TX Ethernet switches. Only one xLP adapter is needed for compliance with IEEE 802.3af or 802.3at powered devices. Since powered devices are designed to accept PoE in either format (alternative A in FIG. 2 or alternative B in FIG. 3), they can receive power regardless of which alternative is implemented in the power sourcing equipment. When operating in alternative A mode, the powered devices automatically adjust for polarity of the power supply voltage. This ensures that the powered device will operate even if a crossover cable is being used.

The exemplary system discussed herein can be used on single UTP two or four-pair cable, as well as dual UTP four-pair cabling systems, with the results being improved power efficiency for PoE delivery. The system provides the end user improved, extended user cabling lengths and cost-saving benefits to the data center energy usage output. In high power settings, the xHP system is designed for high power 60 W and 100 W PoE (i.e., IEEE 802.3bt) which uses four pairs for power and data delivery. The power splitting system and process is similar to the xLP system, but is duplicated on a second set of cables, such as Siamese cables. Siamese cables are readily available on the market as Category 5E and Category 6 rated products, and in multiple lengths from multiple vendors.

Figure 10A:
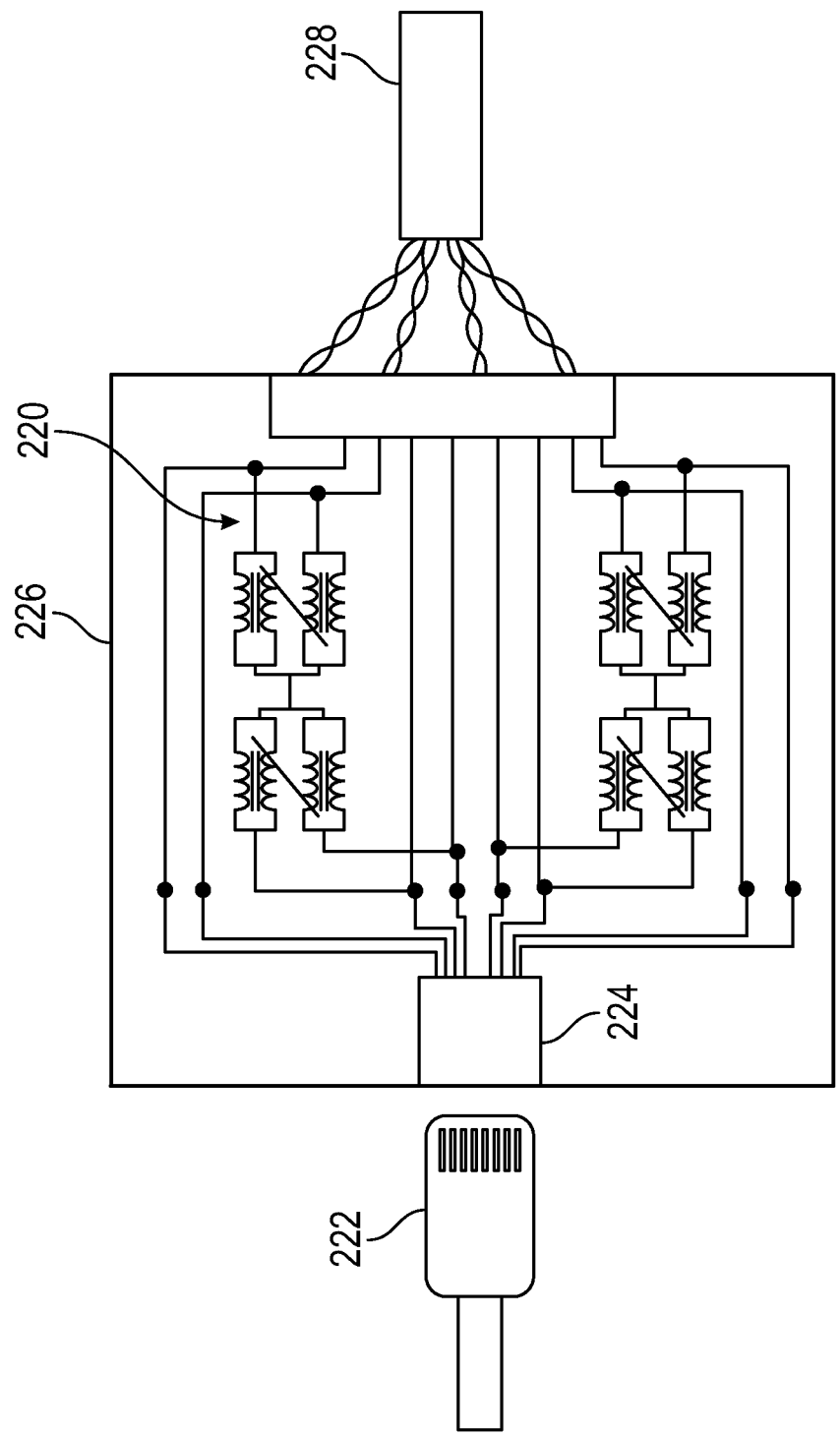
FIG. 10A is a diagrammatic view of a system for power loss reduction incorporated into an insulation displacement block for a four pair Ethernet powered system, in an exemplary embodiment.
Figure 10B:
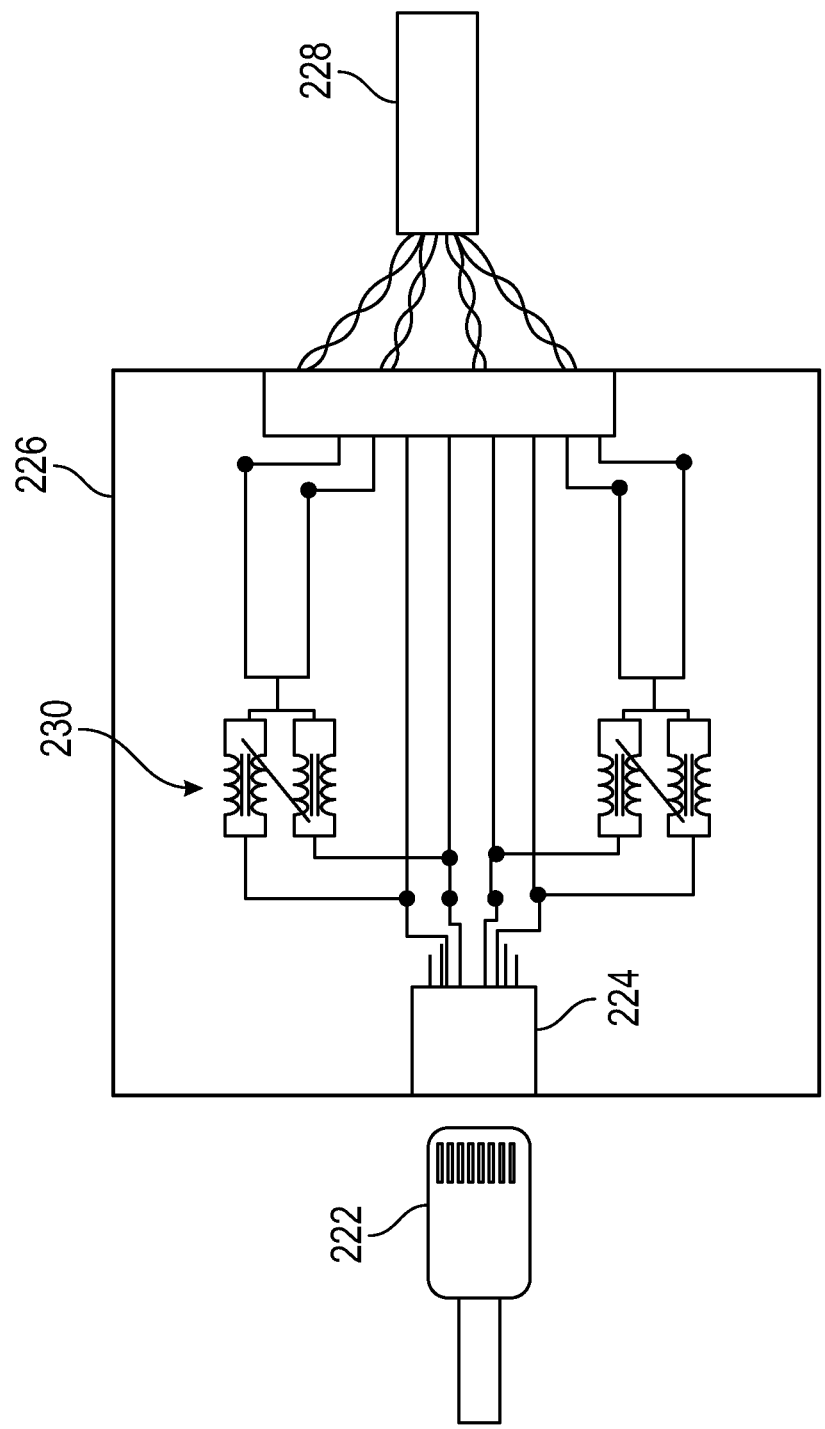
FIG. 10B is a diagrammatic view of a system for power loss reduction incorporated into an insulation displacement block for a two pair Ethernet powered system, in an exemplary embodiment.

FIG. 10A is a diagrammatic view of a system 220 for power loss reduction incorporated into an insulation displacement block for a four pair Ethernet powered system (e.g., 1000BASE-T), and FIG. 10B is a diagrammatic view of a system 230 for power loss reduction incorporated into an insulation displacement block for a two pair Ethernet powered system (e.g., 10BASE-T). Each system 220, 230 includes an input plug 222 (e.g., an RJ45 8P8C plug, or the like) configured to be inserted into an input jack 224 of the insulation displacement block (IDC) 226. The opposing side of the IDC 226 includes an output cable 228 fixedly coupled to the IDC 226.

In some embodiments, rather than the output cable 228, the IDC 226 can include an output jack configured to receive an RJ 45 plug. The correction splitting circuitry within the IDC 226 of the system 220 is directed to four pairs of wires (e.g., similar to the system of FIG. 8), and the correction splitting circuitry within the IDS 226 of the system 230 is directed to two pairs of wires (e.g., similar to the system of FIG. 7 and FIG. 9). In the system 220 of FIG. 10A, four common mode (CM) chokes can be used to block the data signal, allowed the respective wire splitting for power diversion without affecting the data signal. In the system 230 of FIG. 10B, two CM chokes can be used to block the data signal.

Figure 11A:
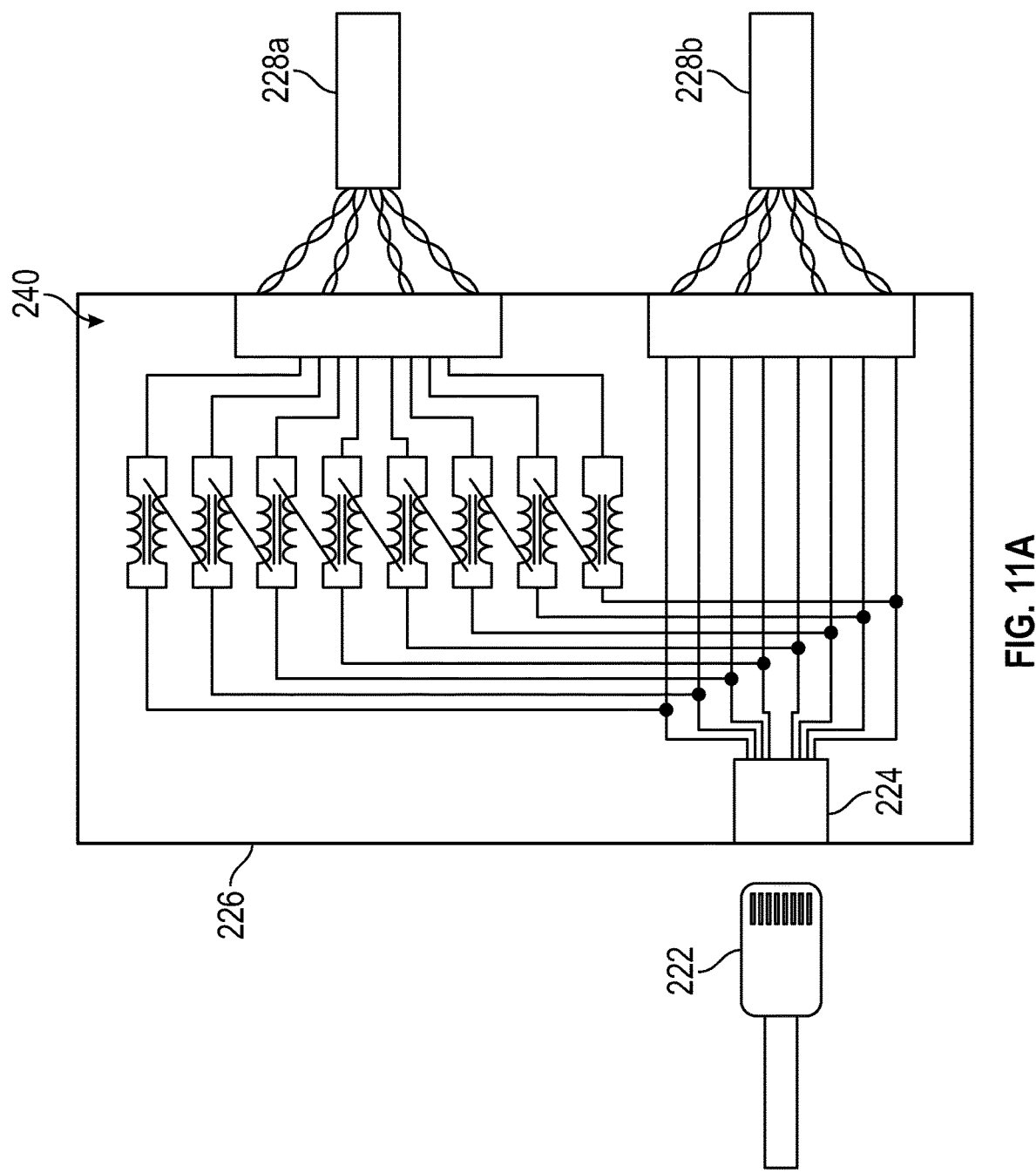
FIG. 11A is a diagrammatic view of a system for power loss reduction incorporated into an insulation displacement block for a four pair Ethernet dual cable powered system in an exemplary embodiment.

FIG. 11A is a diagrammatic view of a system 240 for power loss reduction incorporated into an insulation displacement block for a four pair Ethernet dual cable powered system. The system 240 includes the input plug 222 (e.g., an RJ45 8P8C plug, or the like) configured to be inserted into the input jack 224 of the IDC 226. The opposing side of the IDS 226 includes two output cables 228a, 228b fixedly coupled to the IDC 226. In some embodiments, one or more of the output cables 228a, 228b can be replaced with a jack capable of receiving an RJ45 input plug. The system 240 can include eight CM chokes for power diversion along eight wire pairs.

Figure 11B:
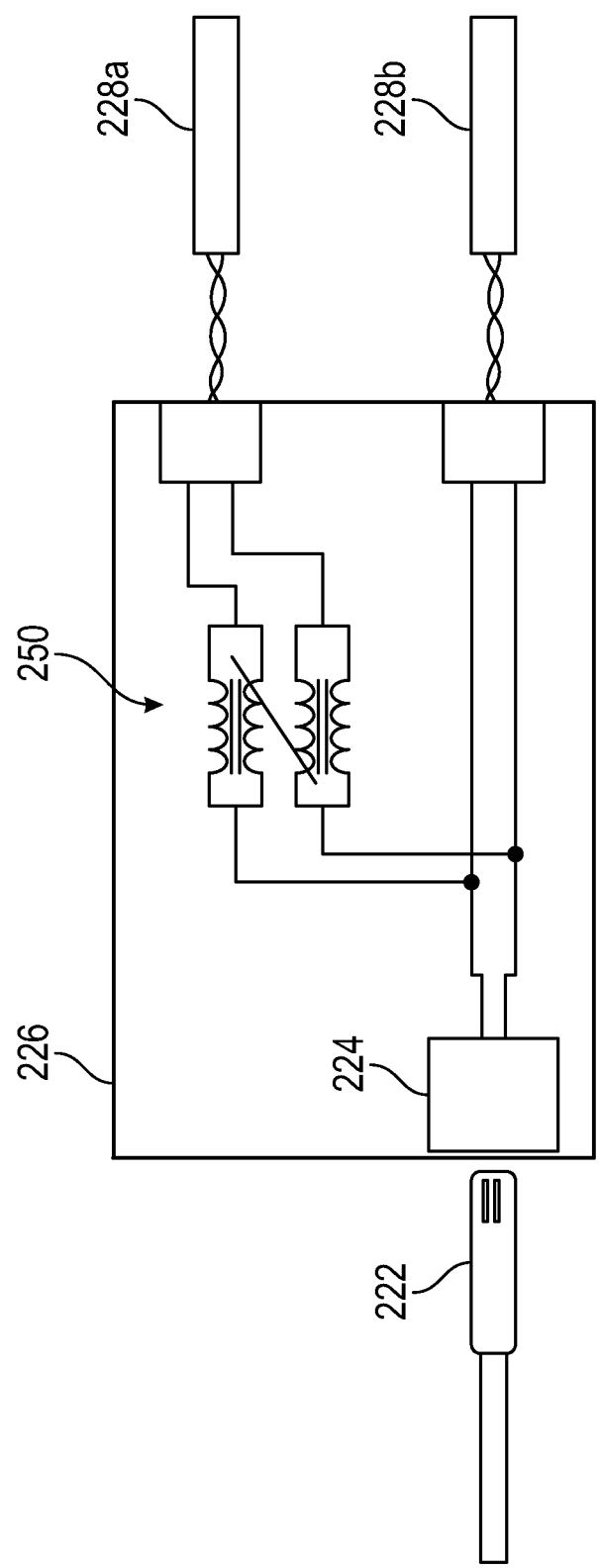
FIG. 11B is a diagrammatic view of a system for power loss reduction incorporated between an input Ethernet connector and an output insulation displacement block for a two pair dual cable powered system of FIG. 16A in an exemplary embodiment.
Figure 16A:
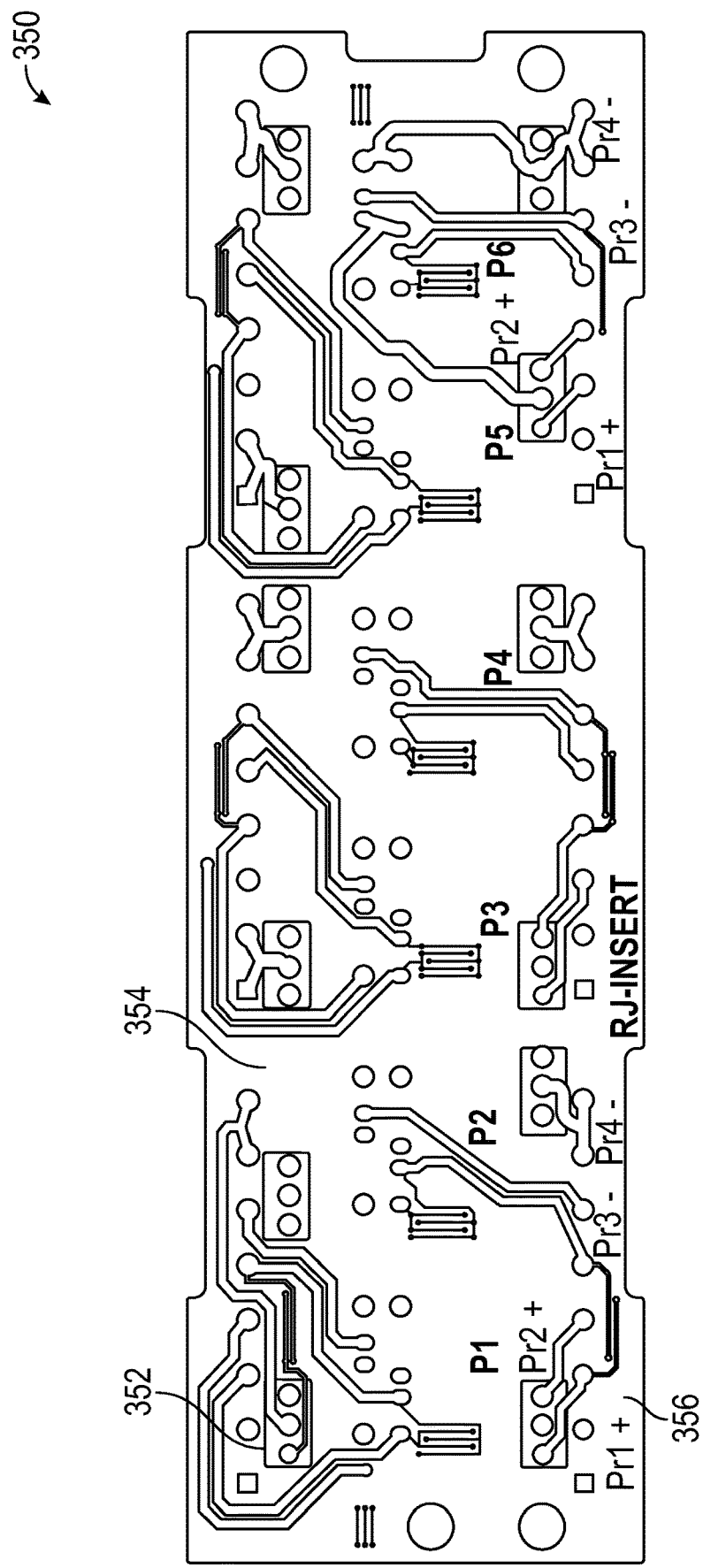
FIG. 16A is a top view of a common mode wide band choke of FIG. 12 incorporated into an electrical configuration on a two layer printed circuit board (PCB), in an exemplary embodiment.

FIG. 11B is diagrammatic view of a system 250 for power loss reduction incorporated between an input single pair Ethernet (SPE) connector (e.g., a one pair plug) and an output insulation displacement block (EDC) for a 2-paired, dual cable powered system of FIG. 16A. The system 250 can be substantially similar to the system 240, except the system 250 includes two CM chokes for power diversion along two wire pairs.

Figure 11C:
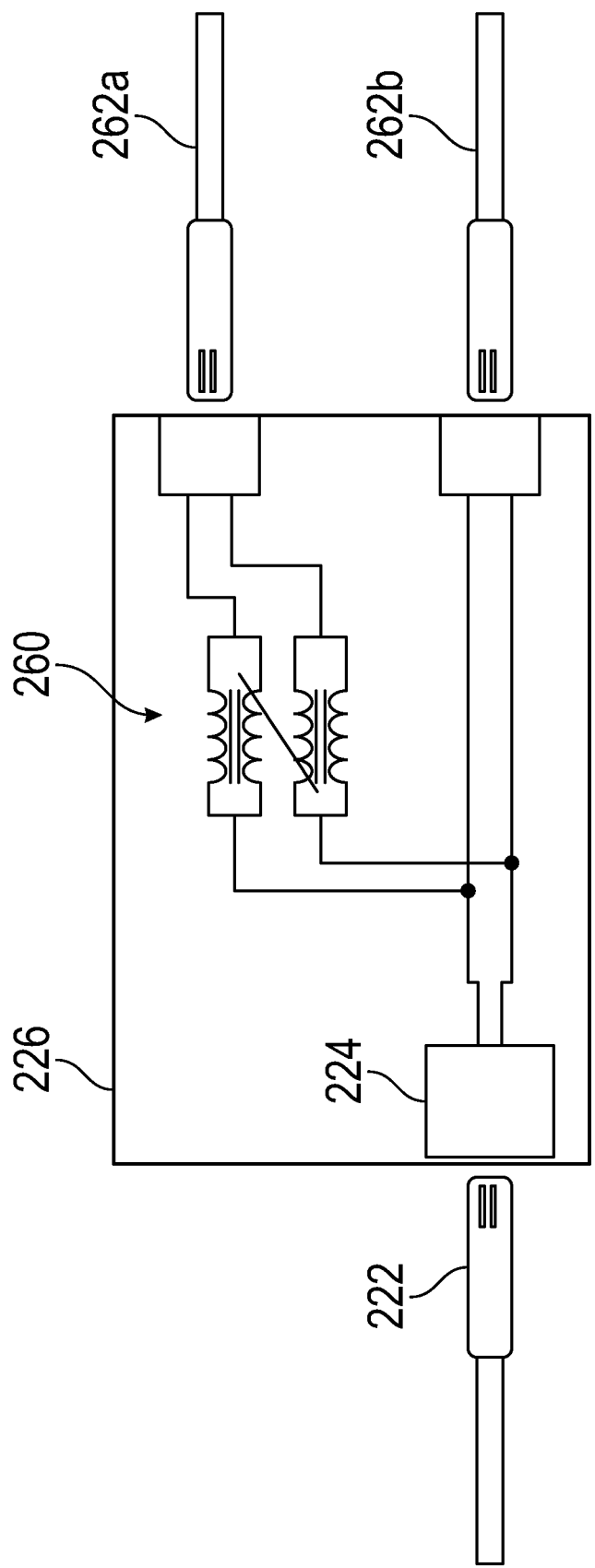
FIG. 11C is a diagrammatic view of a system for power loss reduction incorporated between an input Ethernet connector and an output Ethernet connector for a two pair dual cable powered system of FIG. 16A in an exemplary embodiment.

FIG. 11C is a diagrammatic view of a system 260 for power loss reduction incorporated between an input SPE connector (e.g., a one pair plug) and an output SPE connector (e.g., a one pair plug) for a 2-paired, dual cable powered system of FIG. 16A. The system 260 can be substantially similar to the system 240, except the system 260 includes two output cable plugs 262a, 262b.

Each of FIGS. 11B-11C show the usage of such connection in a one pair cable system using the disclosed internal common mode choke of FIG. 16A in which one line is positive and one pair is negative, as described in IEEE802.3cg and IEEE802.3da. Such connection could be similar to the xHP system, as it would necessitate two such connectors to recombine the DC voltage signal. All systems of FIGS. 11A-13 can also be used for power delivery, if improving DC voltage efficiency was not the objective, as the line taps to other powered devices. In such line tap application, the data signal is blocked off, and each added powered device will reduce the main line power approximately by its requirement.

Figure 12:
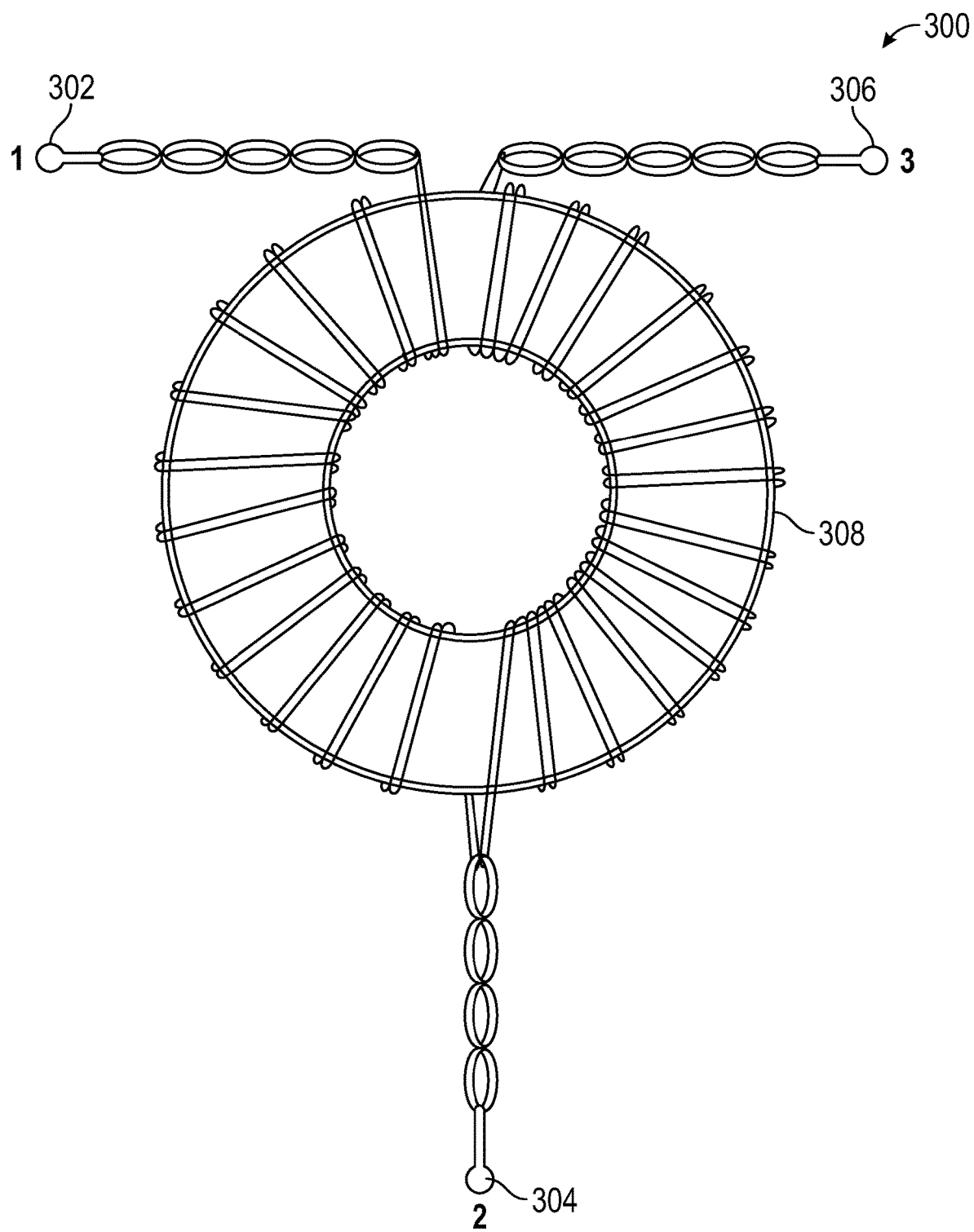
FIG. 12 is a diagrammatic view of a common mode wide band choke capable of being incorporated into a system for power loss reduction of FIG. 7 in an exemplary embodiment.
Figure 13:
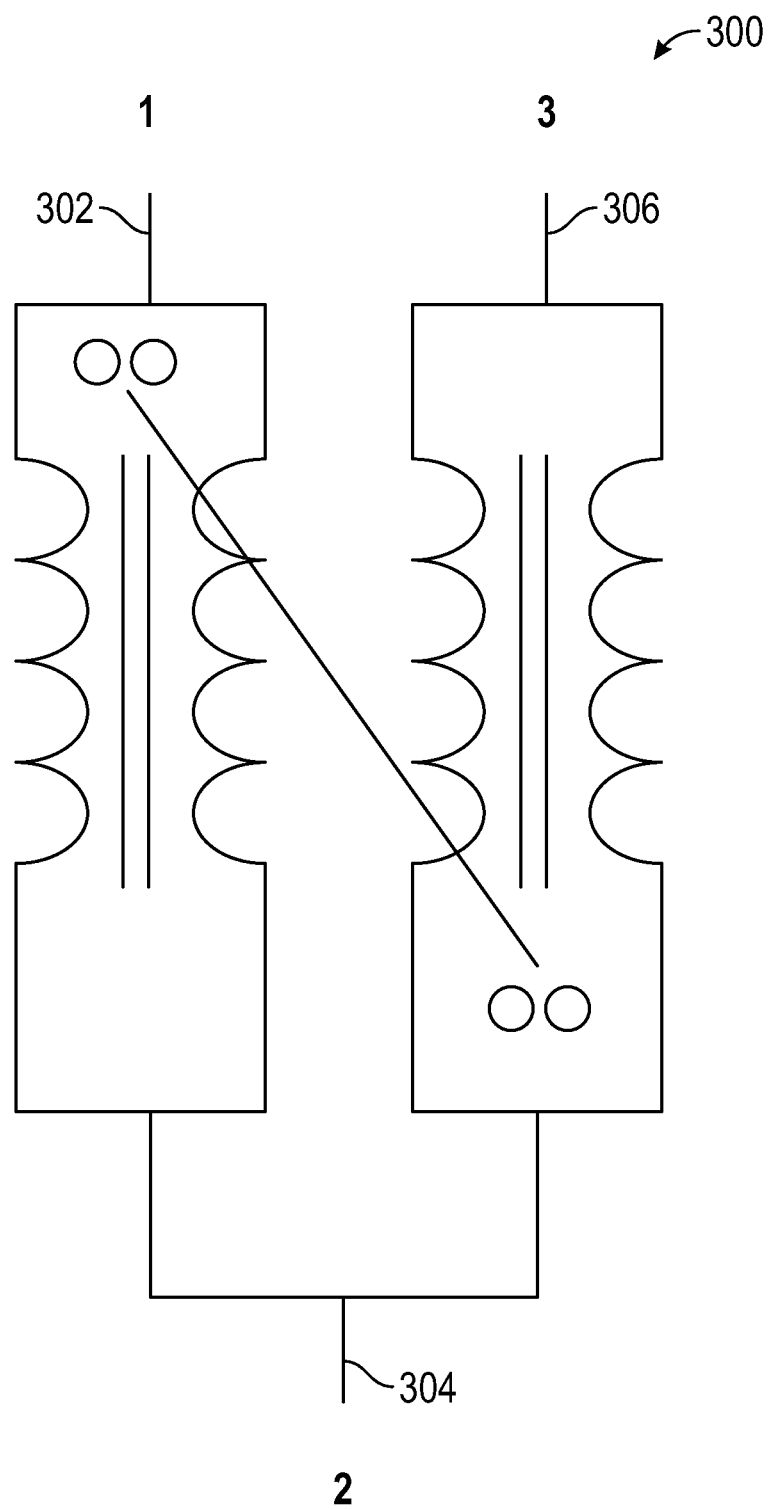
FIG. 13 is a diagrammatic circuit diagram of a common mode wide band choke of FIG. 12 in an exemplary embodiment.

FIG. 12 is a diagrammatic view of a common mode wide band choke 300 capable of being incorporated into the system 100 for power loss reduction of FIG. 7. The choke 300 includes a first wire pair 302, a second wire pair 304, a third wire pair 306, and a magnetic core 308. Operation of the choke 300 relative to the wire pairs is described in U.S. Pat. No. 7,280,032, which is incorporated herein by reference. FIG. 13 is a diagrammatic circuit diagram of the common mode wide band choke 300 of FIG. 12.

Figure 14:
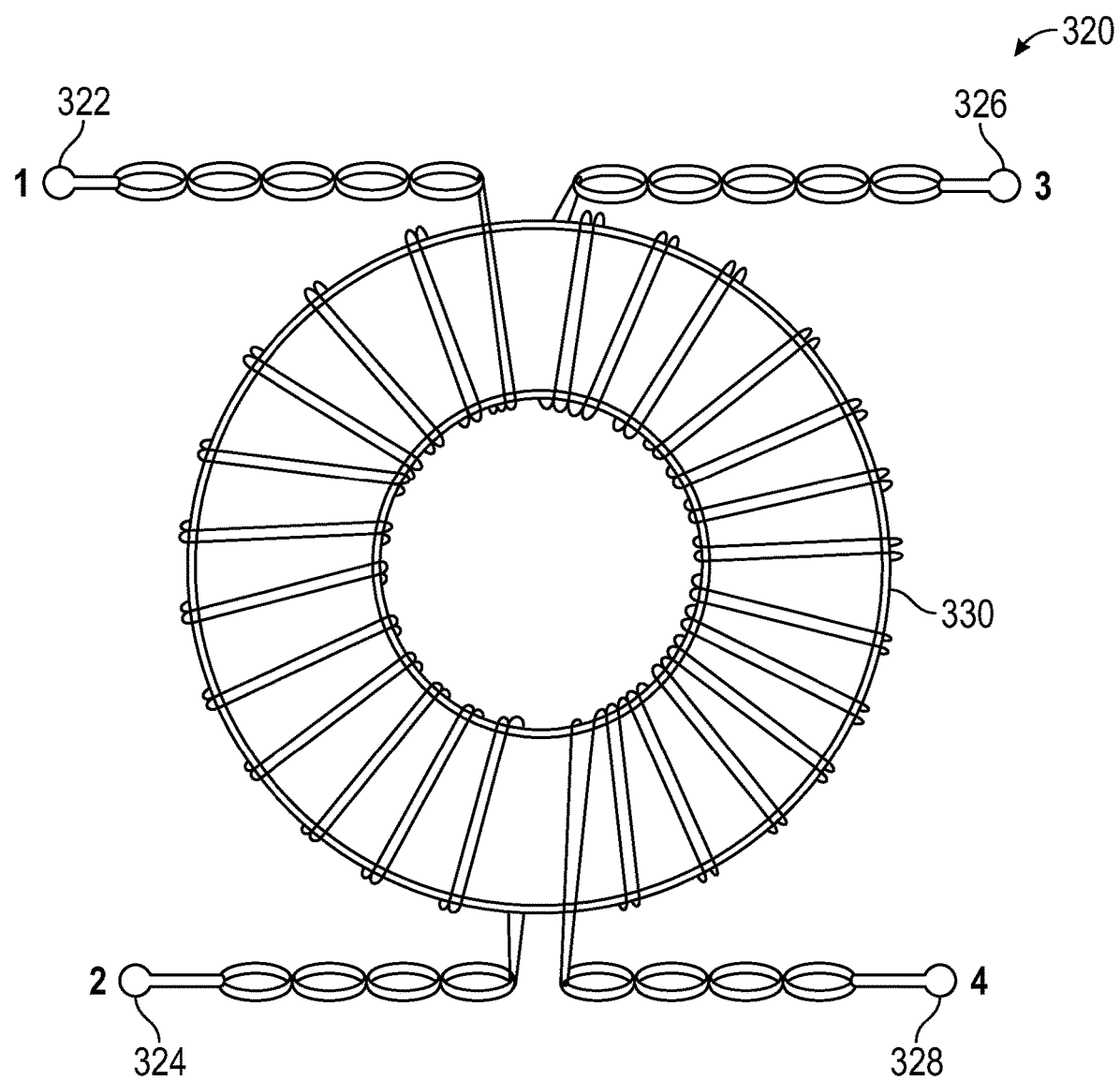
FIG. 14 is a diagrammatic view of a common mode wide band choke capable of being incorporated into a system for power loss reduction of FIG. 8 in an exemplary embodiment.
Figure 15:
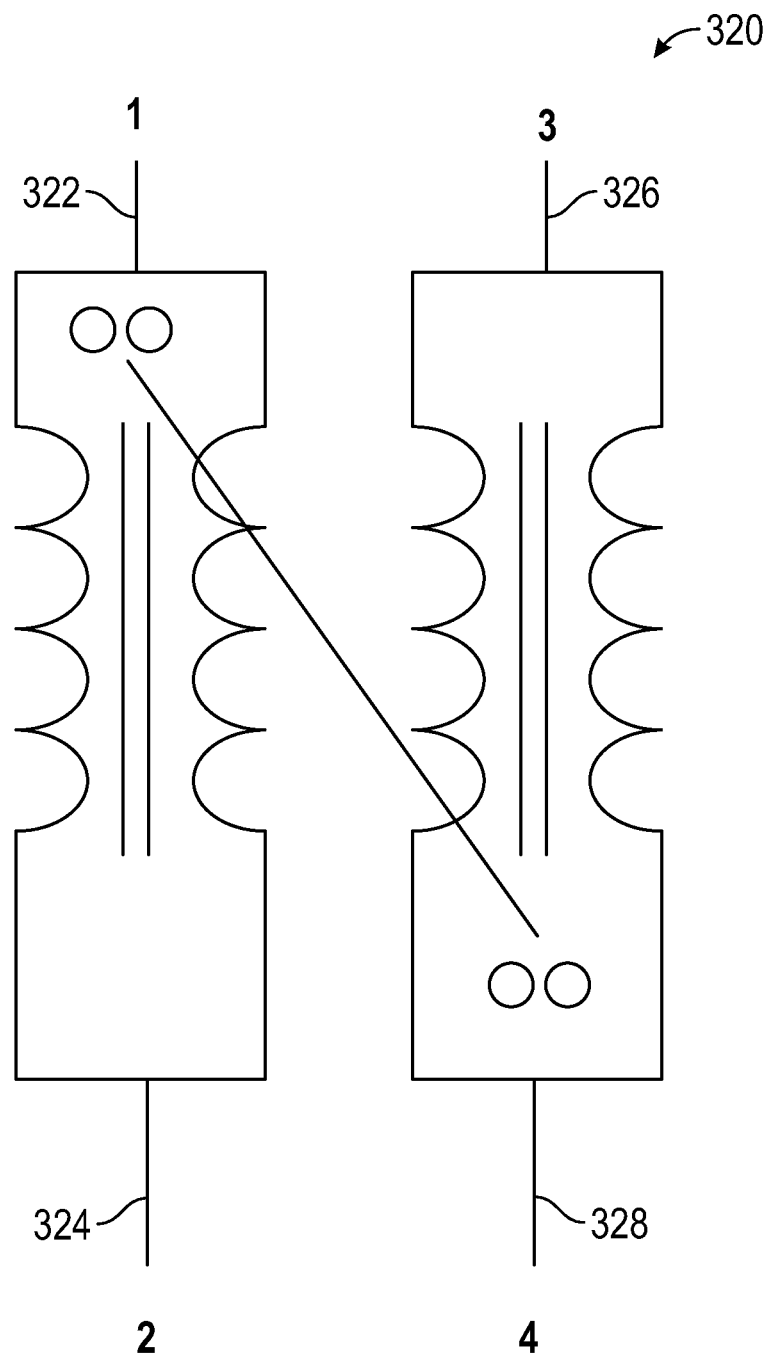
FIG. 15 is a diagrammatic circuit diagram of a common mode wide band choke of FIG. 14.

FIG. 14 is a diagrammatic view of a common mode wide band choke 320 capable of being incorporated into the system 150 for power loss reduction of FIG. 8. The choke 320 includes a first wire pair 322, a second wire pair 324, a third wire pair 326, a fourth wire pair 328, and a magnetic core 330. Operation of the choke 320 relative to the wire pairs is substantially similar to the operation described in U.S. Pat. No. 7,280,032, except the second wire pair 324 and the fourth wire pair 328 are not electrically connected. Each wire input and output is therefore separate, but shares the same toroidal core for opposing electro-magnetic flux to provide data signal reduction. FIG. 15 is a diagrammatic circuit diagram of the common mode wide band choke 320 of FIG. 14.

Figure 16B:
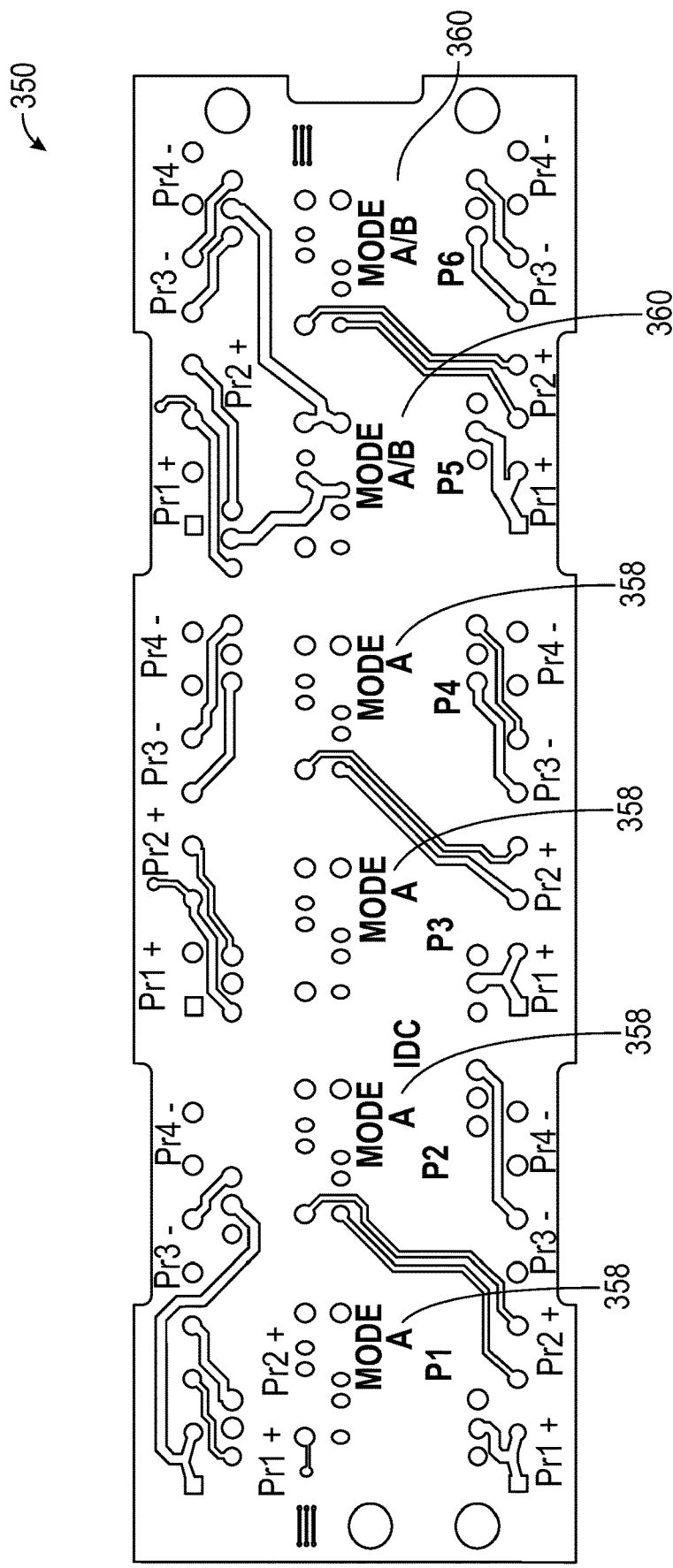
FIG. 16B is a bottom view of the common mode wide band choke of FIG. 12, in an exemplary embodiment.

FIG. 16A is a top view of a common mode wide band choke of FIG. 12 incorporated into an electrical configuration on a two layer printed circuit board (PCB) 350, and FIG. 16B is a bottom view of the common mode wide band choke of FIG. 12 incorporated into the PCB 350. In particular, section 352 represents the common mode wide band choke, section 354 represents the RJ45 connection, and section 356 represents the IDC(s). Circuitry 358 represents the mode or alternative A operation for the system (e.g., IEEE 802.3 at and 802.3 af (such as the system of FIG. 2)), and circuitry 360 represents the mode A/B operation of the system (e.g., IEEE 802.3 at and 802.3 af (such as the system of FIG. 3)). The configuration of the choke in FIGS. 16A and 16B can be used as an insert capable of being incorporated into an existing system such that power splitting can be performed by the system. The PCB 350 includes therein the integrated pair-to-pair signal compensation sections which reduce the coupled noise from adjacent data signal noises. Details of the PCB 350 are described in U.S. Pat. No. 7,280,032, which is incorporated herein by reference.

Figure 17:
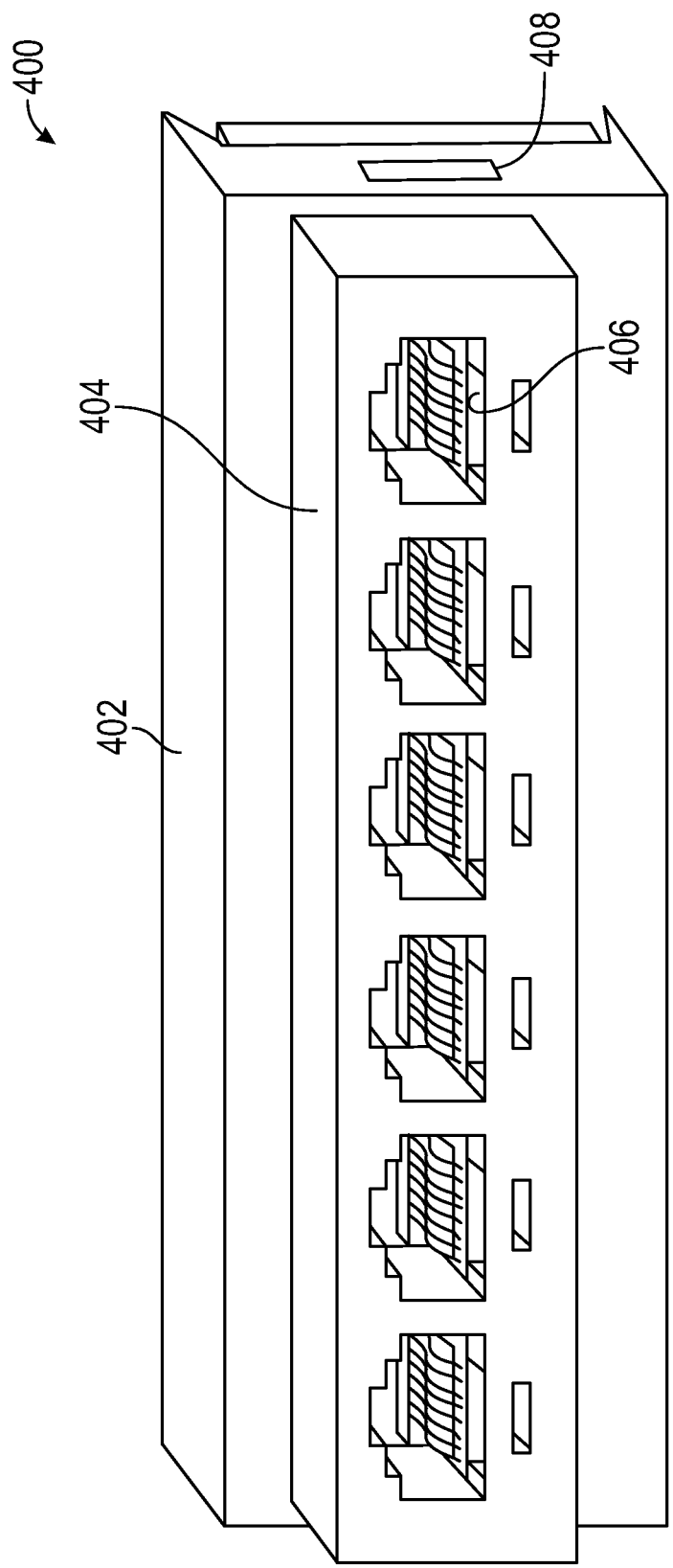
FIG. 17 is a diagrammatic front view of a connector module for a patch panel unit that incorporates a system for power loss reduction in an exemplary embodiment.

FIG. 17 is a diagrammatic front view of a connector module 400 for a patch panel unit that incorporates circuitry one of the systems for power loss reduction discussed herein. The front face of the module 400 includes a housing 402 with a protruding housing section 404. The front face of the section 404 includes jacks 406 capable of receiving an Ethernet plug, and internal circuitry discussed herein splits the power transmission received at the Ethernet plug into respective wire pairs to improve power transmission. In some embodiments, the module 400 can include six jacks 406, although a greater or smaller number of jacks 406 is also envisioned. The sides of the housing 402 include grooves 408 configured for receipt of a complementary locking flange of a patch panel unit.

Figure 18:
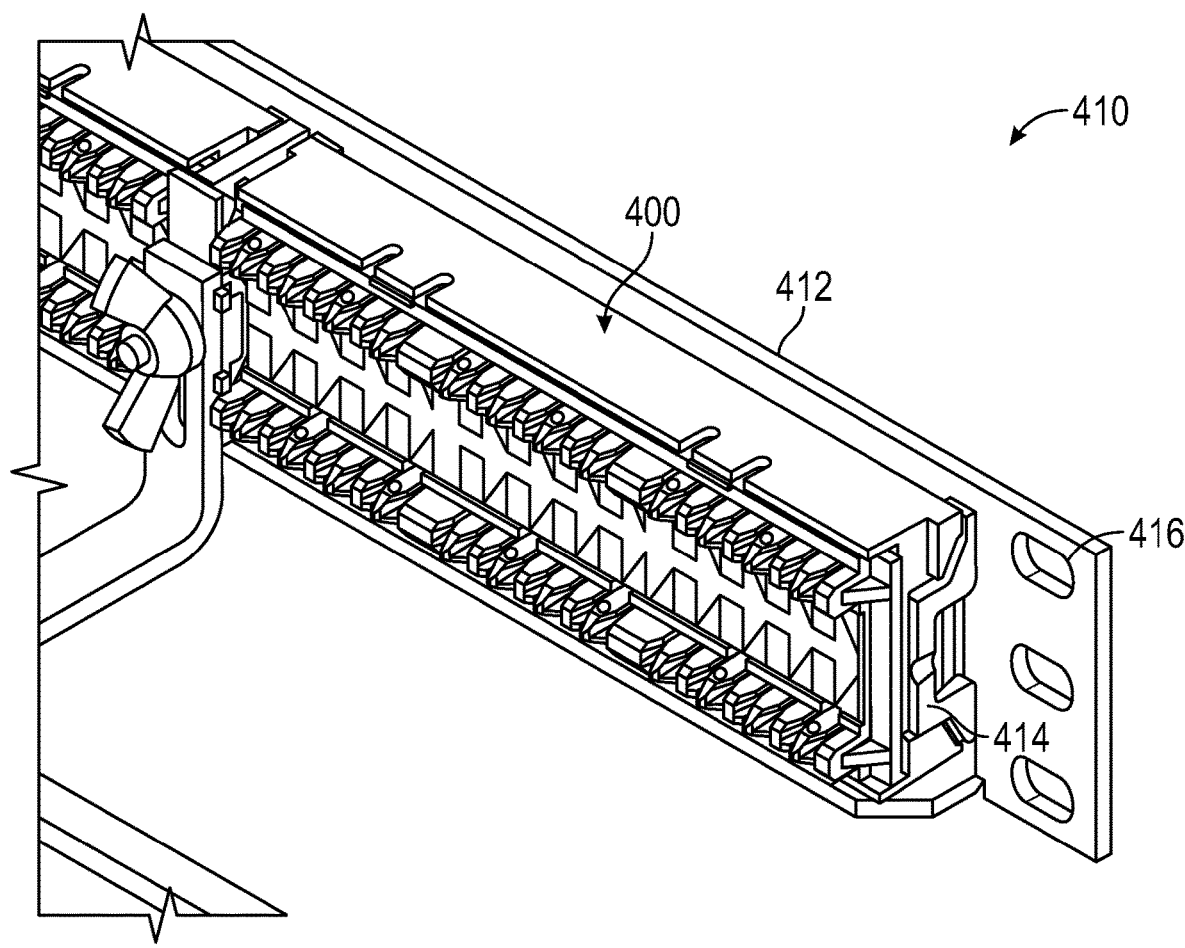
FIG. 18 is a diagrammatic rear view of a connector module that incorporates a system for power loss reduction coupled to a patch panel unit in an exemplary embodiment.

FIG. 18 is a diagrammatic rear view of the connector module 400 coupled to a patch panel unit 410. The unit 410 includes a front face plate 412 with an opening configured to at least partially receive therethrough the section 404 of the module 400. The unit 412 includes latches 414 on opposing sides with locking flanges capable of snapping into and engaging with the grooves 408 of the module 400 to retain the module 400 assembled with the patch panel unit 410. The unit 410 includes mounting holes 416 for mounting the unit 410 to rails of a rack.

Figure 19:
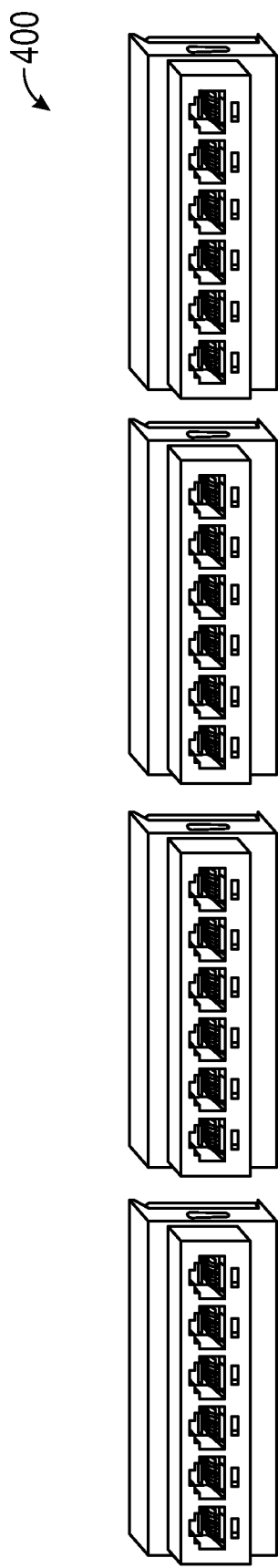
FIG. 19 is a diagrammatic front view of connector modules of FIG. 17 for assembly with a patch panel unit in an exemplary embodiment.
Figure 20:
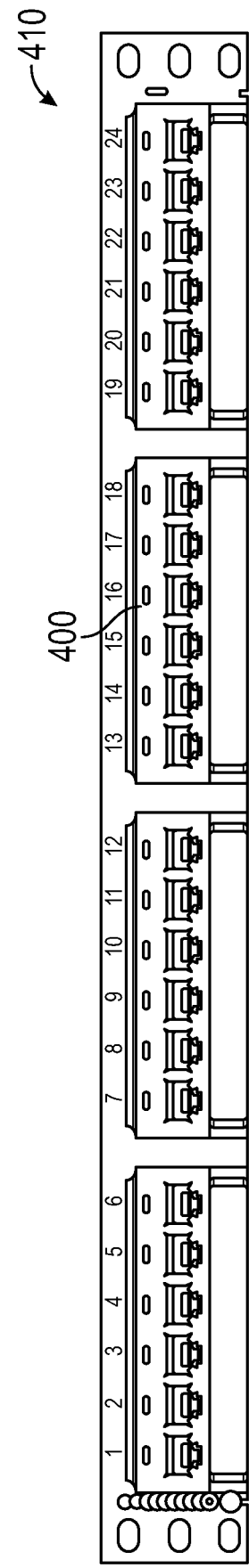
FIG. 20 is a diagrammatic front view of connector modules assembled with a patch panel unit in an exemplary embodiment.

FIG. 19 is a diagrammatic front view of connector modules 400 of FIG. 17 for assembly with a patch panel unit 410, and FIG. 20 is a diagrammatic front view of connector modules 400 assembled with a patch panel unit 410 in an exemplary embodiment. In some embodiments, the patch panel unit 410 can be a standard metal patch panel arrangement holding unit configured to retain the modules 400.

Figure 21:
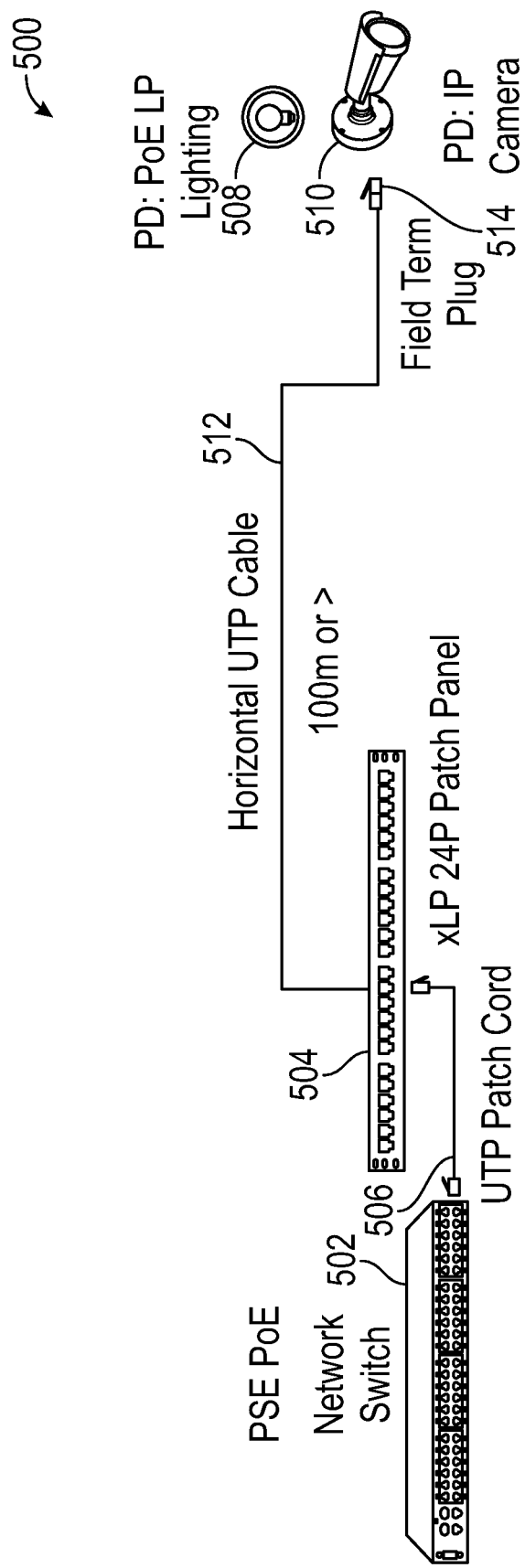
FIG. 21 is a diagrammatic view of a system for power loss reduction incorporated in a standard Ethernet UTP cabling system in an exemplary embodiment.

FIG. 21 illustrates an example application of the system using the xLP adapter in a standard Ethernet UTP cabling system 500. As used in the diagrams herein, Pc1 and Pc2 can represent rj45 UTP patch cords, FTP1 can represent an RJ45 field termination plug, and Hc1 can represent a four pair UTP horizontal cable. The system 500 includes a PoE network switch 502 as the power sourcing equipment (PSE) electrically and communicatively connected to a patch panel 504 (e.g., an xLP 24P patch panel) by a UTP patch cord 506. In some embodiments, the corrective circuits of the exemplary system (e.g., corrective circuits A and B of FIGS. 7-9) can be incorporated into the patch panel 504. In some embodiments, the corrective circuits can be incorporated into other cabling device structure, e.g., stand-alone station jack modules (see, e.g., FIG. 22 xHP patch panel), additional adapter panels that can be patched to a structure cabling system (e.g., such as the patch panels 704, 708 of FIG. 23), combinations thereof, or the like. The patch panel 504 is electrically and communicatively connected to one or more powered devices 508, 510 (e.g., a PoE LP lighting, an IP camera, or the like) via a horizontal cable 512 (e.g., a horizontal C6 UTP cable) at a distance of 100 m or less. The powered devices 508, 510 can be connected to a field termination plug 514 of the horizontal cable 512.

The exemplary system may be used in telecommunications cabling applications having powered devices at distances less than, equal to, or greater than 100 m. The distance of the powered devices at an end-point from the network switch is taken into account when incorporating the system to ensure the desired amount of power is provided efficiently. Based on testing, the DC power evaluations have illustrated improved power efficiency when traditional cabling system adapters are replaced with an exemplary xLP or xHP adapter. Use of the exemplary system can achieve significant long term savings in data center energy to the end user as compared to traditional systems.

Figure 22:
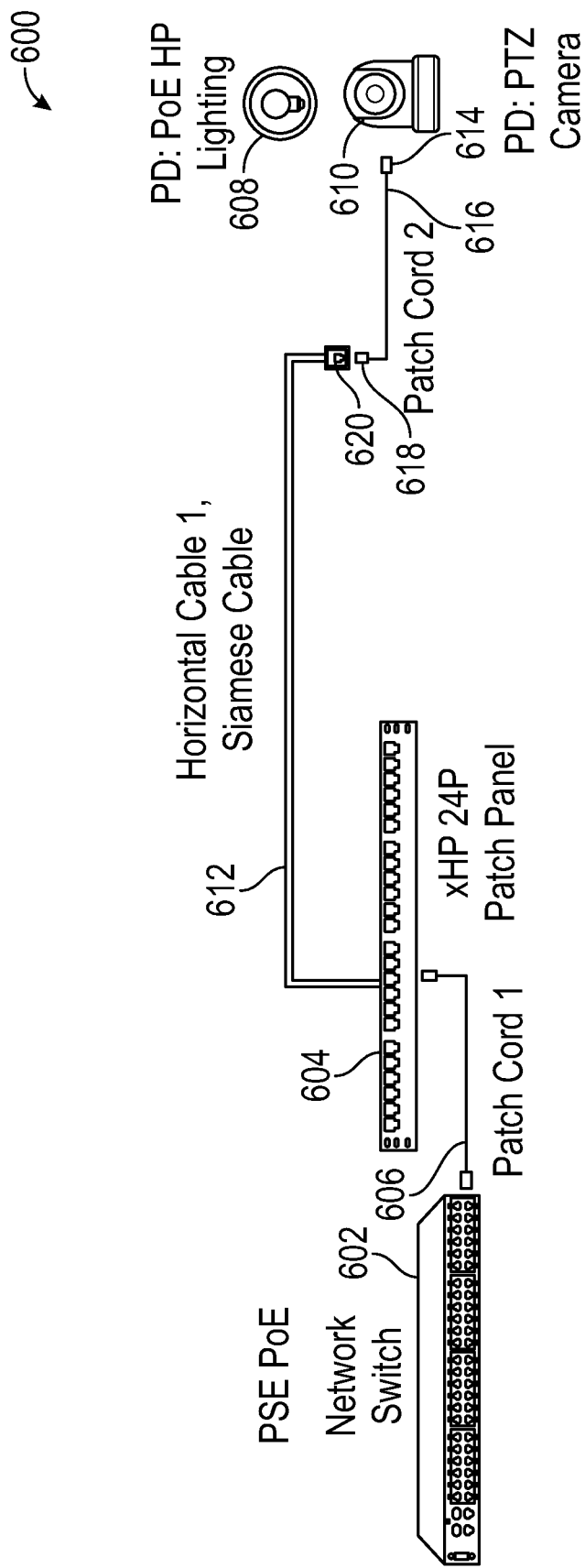
FIG. 22 is a diagrammatic view of a system for power loss reduction incorporated into a standard Ethernet UTP cabling system in an exemplary embodiment.

FIG. 22 is a diagrammatic view of a system for power loss reduction incorporated into a standard Ethernet UTP cabling system 600 in an exemplary embodiment. The system 600 includes a PoE network switch 602 as the power sourcing equipment (PSE) electrically and communicatively connected to a high power patch panel 604 (e.g., an xHP 24P patch panel) by a UTP patch cord 606. The corrective circuits can be incorporated into, e.g., the patch panel 604, stand-alone station jack modules, additional adapter panels that can be patched to a structure cabling system, combinations thereof, or the like. The patch panel 604 is electrically and communicatively connected to one or more powered devices 608, 610 (e.g., PoE high power light, a PTZ camera, or the like) via a horizontal cable 612 (e.g., a Siamese cable). The powered devices 608, 610 can be connected to a field termination plug 614 of a patch cord 616. The patch cord 616 can include a field termination plug 618 at an opposing end such that the plug 618 can be electrically coupled to a high power jack 620.

Figure 23:
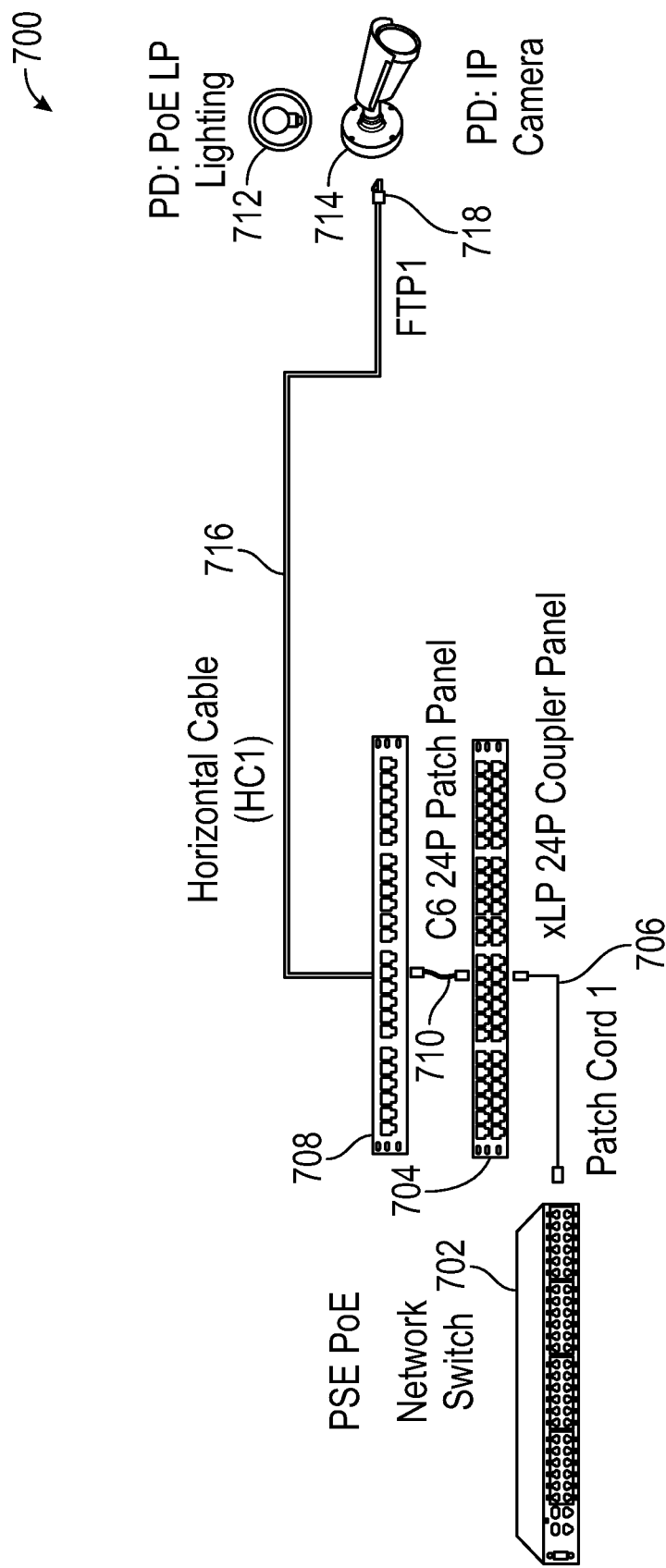
FIG. 23 is a diagrammatic view of a system for power loss reduction incorporated into a standard Ethernet UTP cabling system that is external to a structured cabling system in an exemplary embodiment.

FIG. 23 is a diagrammatic view of a system for power loss reduction incorporated into a standard Ethernet UTP cabling system 700 that is external to a structured cabling system in an exemplary embodiment. The system 700 includes a PoE network switch 702 as the power sourcing equipment (PSE) electrically and communicatively connected to a first patch panel 704 (e.g., an xLP 24P coupler patch panel) by a UTP patch cord 706. The system 700 includes a secondary patch panel 708 (e.g., a C6 24P patch panel) connected to the patch panel 704 by a UTP patch cord 710. The corrective circuits can be incorporated into, e.g., the patch panel 704, the patch panel 708, stand-alone station jack modules, additional adapter panels that can be patched to a structure cabling system, combinations thereof, or the like. The patch panel 708 is electrically and communicatively connected to one or more powered devices 712, 714 (e.g., PoE low power light, an IP camera, or the like) via a horizontal cable 716. The powered devices 712, 714 can be connected to a field termination plug 718 of the horizontal cable 716.

Figure 24:
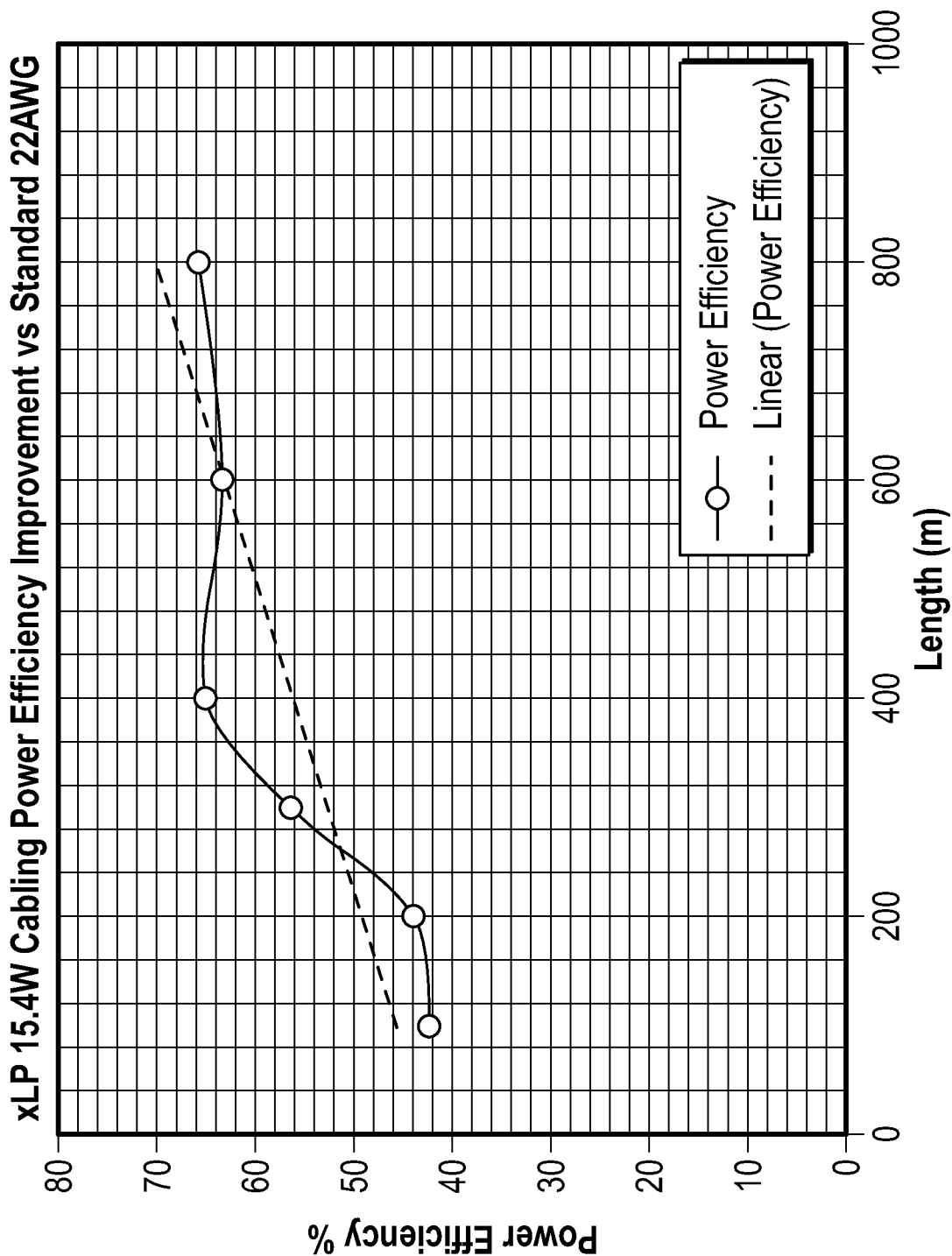
FIG. 24 is a graph of power efficiency improvement when converting from a standard cabling system to a cabling system for power loss reduction (xLP) in an exemplary embodiment.
Figure 25:
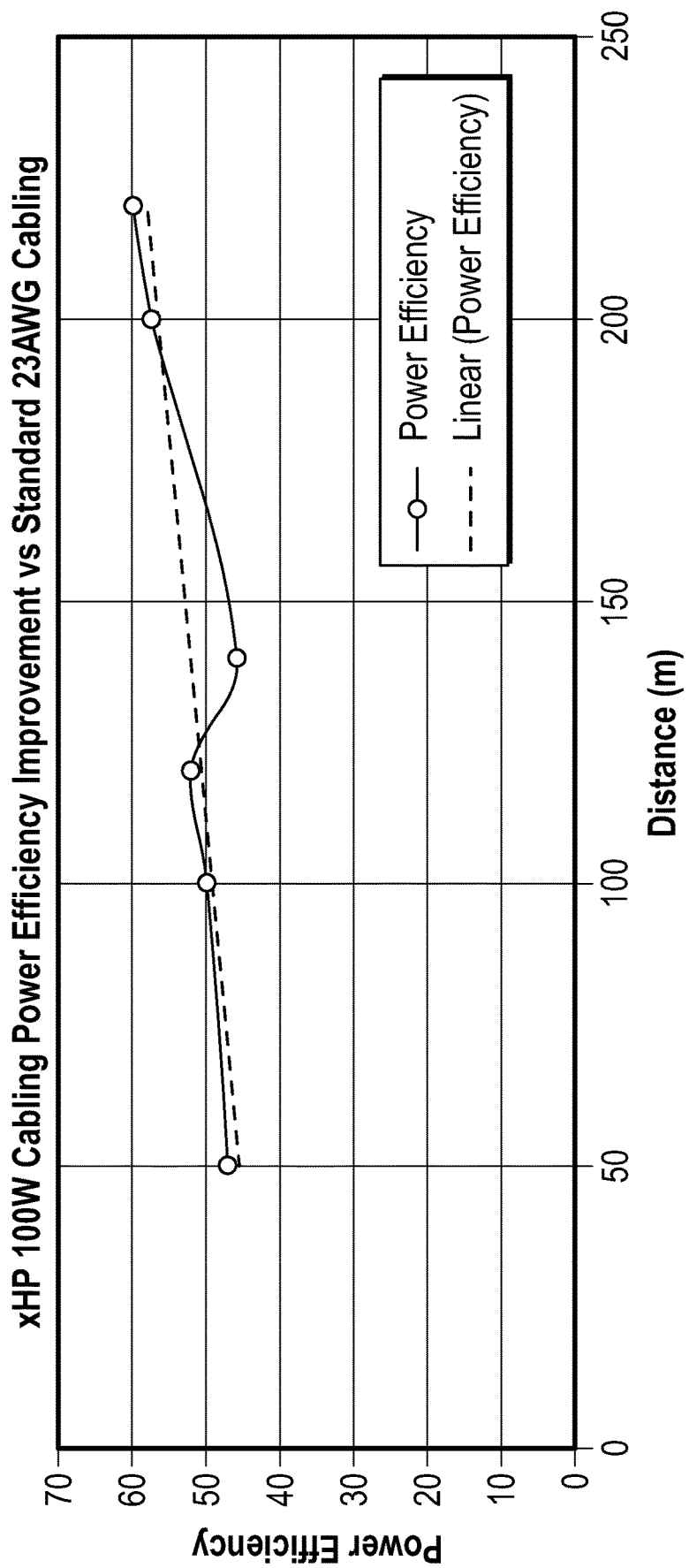
FIG. 25 is a graph of power efficiency improvement when converting from a standard cabling system to a cabling system for power loss reduction (xHP) in an exemplary embodiment.

FIGS. 24 and 25 show the power efficiency improvement when adding or switching out a standard connectivity (e.g., a patch panel) with an exemplary xLP patch panel or adding an xHP adapter panel, respectively. In particular, FIG. 24 shows the power efficiency improvement when using an xLP cabling system at various cabling lengths for 15.4 W/350 mA power source equipment to a 13 W powered device. Power efficiencies improved by over 50% on the average per cable distances when switched to the xLP adapters (as compared to traditional systems).

FIG. 25 shows the power efficiency improvement when using an xHP cabling system at various cabling lengths for 100 W/1,000 mA power source equipment to a 71 W powered device. Power efficiencies improved by over 50% on the average per cable distances when switched to the xHP adapters (as compared to traditional systems). In the case of an xHP system, two xHP connectivity devices may be needed (as shown in FIG. 22), one at the near-end and one at the far-end. The cable length is based on the PSE Ethernet transmission speed requirements for data. For example, at the lower the speeds, 10BASE-T will typically transmit data further (longer cabling lengths) than 100BASE-T and 1000BASE-T because of its simpler signal protocols and lower signal frequency bandwidth requirement.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for reducing power loss in telecommunications cabling, the system comprising:
   a power supply;
   at least one powered device;
   a cabling system electrically and communicatively connecting the power supply to the at least one powered device, the cabling system including a first positive polarity wire pair, a second positive polarity wire pair, a first negative polarity wire pair, and a second negative polarity wire pair; and
   a first correction circuit including wiring connecting the first positive polarity wire pair with the second positive polarity wire pair, and a second correction circuit including wiring connecting the first negative polarity wire pair with the second negative polarity wire pair;
   wherein at least one of:
   (i) the first correction circuit is configured to split power signals for transmission along both the first and second positive polarity wire pairs, and block data signals for transmission along the second positive polarity wire pair; or
   (ii) the second correction circuit is configured to split power signals for transmission along both the first and second negative polarity wire pairs, and block transmission of data signals along the second negative polarity wire pair.

2. The system of claim 1, wherein the power supply is a power sourcing equipment providing a direct current (DC) to the cabling system.

3. The system of claim 1, wherein the power supply is a Power-over-Ethernet switch.

4. The system of claim 1, wherein the cabling system is an Ethernet twisted pair cabling system.

5. The system of claim 1, wherein the cabling system is a horizontal cable circuit.

6. The system of claim 1, wherein if (i), the first correction circuit splits the power signals at a proximal end, relative to the power supply, of the cabling system for transmission of the power signals along both the first and second positive polarity wire pairs to a distal end, relative to the power supply of the cabling system.

7. The system of claim 6, wherein the system includes a third correction circuit with wiring merging the second positive polarity wire pair with the first positive polarity wire pair at the distal end of the cabling system to transmit the power signals to the at least one powered device only along the first positive polarity wire pair.

8. The system of claim 1, wherein if (ii), the second correction circuit splits the power signals at a distal end, relative to the power supply, of the cabling system for transmission of the power signals along both the first and second negative polarity wire pairs to a proximal end, relative to the power supply, of the cabling system.

9. The system of claim 8, wherein the system includes a fourth correction circuit with wiring merging the second negative polarity wire pair with the first negative polarity wire pair at the proximal end of the cabling system to transmit the power signals to the power supply only along the first negative polarity wire pair.

10. The system of claim 1, wherein the at least one powered device is a camera or a light.

11. A power loss reduction device for a cabling system including a first positive polarity wire pair and a first negative polarity wire pair, the power loss reduction device comprising:
  a first correction circuit configured to be electrically and communicatively connected to a proximal end, relative to a power supply, of the cabling system, the first correction circuit including a second positive polarity wire pair and wiring connecting the first positive polarity wire pair with the second positive polarity wire pair; and
  a second correction circuit configured to be electrically and communicatively connected to a distal end, relative to the power supply, of the cabling system, the second correction circuit including a second negative polarity wire pair and wiring connecting the first negative polarity wire pair with the second negative polarity wire pair;
  wherein at least one of:
    (i) the first correction circuit is configured to split power signals at the proximal end of the cabling system for transmission of the power signals along both the first and second positive polarity wire pairs to the distal end of the cabling system, and further configured to block data signals from transmission along the second positive polarity wire pair; or
    (ii) the second correction circuit is configured to split power signals at the distal end of the cabling system for transmission of the power signals along both the first and second negative polarity wire pairs to the proximal end of the cabling system, and further configured to block data signals from transmission along the second negative polarity wire pair.

12. The power loss reduction device of claim 11, wherein if (i), the second correction circuit includes wiring that merges the second positive polarity wire pair with the first positive polarity wire pair at the distal end of the cabling system to transmit the power signals to at least one powered device only along the first positive polarity wire pair.

13. The power loss reduction device of claim 11, wherein if (ii), the first correction circuit includes wiring that merges the second negative polarity wire pair with the first negative polarity wire pair at the proximal end of the cabling system to transmit the power signals to the power supply only along the first negative polarity wire pair.

14. A method of reducing power loss in telecommunications cabling, the method comprising:
  providing power from a power supply to a cabling system, the cabling system including a first positive polarity wire pair and a first negative polarity wire pair;
  electrically and communicatively connecting the power supply to at least one powered device with the cabling system;
  connecting a first correction circuit and a second correction circuit to the cabling system, the first correction circuit including a second positive polarity wire pair and wiring connecting the first positive polarity wire pair with the second positive polarity wire pair, the second correction circuit including a second negative polarity wire pair and wiring connecting the first negative polarity wire pair with the second negative polarity wire pair; and
  the method further comprising at least one of:
    (i) splitting power signals at a proximal end, relative to the power supply, of the cabling system with the wiring of the first correction circuit for transmission of the power signals along both the first and second positive polarity wire pairs to a distal end, relative to the power supply, of the cabling system, and blocking transmission of data signals along the second positive polarity wire pair; or
    (ii) splitting power signals at the distal end of the cabling system with the wiring of the second correction circuit for transmission of the power signals along both the first and second negative polarity wire pairs to the proximal end of the cabling system, and blocking transmission of data signals along the second negative polarity wire pair.

15. The system of claim 14, wherein if (i), the method comprises:
  merging the second positive polarity wire pair with the first positive polarity wire pair at the distal end of the cabling system to transmit the power signals to the at least one powered device only along the first positive polarity wire pair.

16. The system of claim 14, wherein if (ii), the method comprises:
  merging the second negative polarity wire pair with the first negative polarity wire pair at the proximal end of the cabling system to transmit the power signals to the power source only along the first negative polarity wire pair.

* * * * *